(12) United States Patent
Sato et al.

(10) Patent No.: US 11,441,472 B2
(45) Date of Patent: Sep. 13, 2022

(54) CONTROL DEVICE, EXHAUST GAS PURIFICATION SYSTEM, AND CONTROL METHOD

(71) Applicant: MITSUBISHI HEAVY INDUSTRIES ENGINE & TURBOCHARGER, LTD., Sagamihara (JP)

(72) Inventors: Daisuke Sato, Sagamihara (JP); Tomohide Yamada, Sagamihara (JP); Mizuki Kanai, Sagamihara (JP); Kazuki Nishizawa, Tokyo (JP); Kazutoshi Nomura, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/265,942

(22) PCT Filed: Aug. 2, 2019

(86) PCT No.: PCT/JP2019/030498
§ 371 (c)(1),
(2) Date: Feb. 4, 2021

(87) PCT Pub. No.: WO2020/031893
PCT Pub. Date: Feb. 13, 2020

(65) Prior Publication Data
US 2021/0301707 A1 Sep. 30, 2021

(30) Foreign Application Priority Data
Aug. 8, 2018 (JP) .............................. JP2018-149787

(51) Int. Cl.
*F01N 11/00* (2006.01)
*F01N 13/00* (2010.01)
(Continued)

(52) U.S. Cl.
CPC ............ *F01N 11/00* (2013.01); *F01N 3/0235* (2013.01); *F01N 3/035* (2013.01); *F01N 9/002* (2013.01);
(Continued)

(58) Field of Classification Search
CPC ........ F01N 11/00; F01N 9/002; F01N 13/009; F01N 3/035; F01N 3/0235; F01N 2900/0422; F01N 2900/08; F01N 2250/02
See application file for complete search history.

(56) References Cited

U.S. PATENT DOCUMENTS 5,078,110 A 1/1992 Rodefeld
2003/0005686 A1 * 1/2003 Hartick ................... F01N 9/005
60/298

(Continued)

FOREIGN PATENT DOCUMENTS

DE  20 2014 003 887 U1  9/2015
EP  1 627 998 A1  2/2006
(Continued)

OTHER PUBLICATIONS

Partial Supplemental European Search Report dated Nov. 12, 2021 issued in the corresponding European Application No. 19847836.4.

*Primary Examiner* — Brandon D Lee
(74) *Attorney, Agent, or Firm* — Birch, Stewart, Kolasch & Birch, LLP

(57) ABSTRACT

A control device is configured to direct an opening degree of a throttle valve disposed in an intake passage or an exhaust passage of an engine including a DOC disposed in the exhaust passage and a DPF disposed downstream of the DOC in the exhaust passage. The control device includes: a hysteresis occurring condition determination unit configured to determine whether a hysteresis occurring condition (predetermined time elapses after instructed opening degree of throttle valve becomes equal to or smaller than predeter- (Continued)

mined opening degree and/or predetermined time elapses after engine output becomes equal to or smaller than predetermined output) is met; and a hysteresis elimination execution unit configured to cause, if it is determined that the hysteresis occurring condition is met, the throttle valve to execute hysteresis elimination that involves temporarily increasing the opening degree of the throttle valve from the instructed opening degree and then returning it to the instructed opening degree.

11 Claims, 9 Drawing Sheets

(51) Int. Cl.
*F01N 3/023* (2006.01)
*F01N 3/035* (2006.01)
*F01N 9/00* (2006.01)

(52) U.S. Cl.
CPC ........ *F01N 13/009* (2014.06); *F01N 2250/02* (2013.01); *F01N 2900/0422* (2013.01); *F01N 2900/08* (2013.01)

(56) References Cited

U.S. PATENT DOCUMENTS

| | | |
|---|---|---|
| 2006/0201144 A1 | 9/2006 | Gabe et al. |
| 2011/0139136 A1* | 6/2011 | Guo ................ F02B 37/22 123/676 |
| 2012/0053812 A1* | 3/2012 | Bauerle ............ F02M 26/49 701/101 |

FOREIGN PATENT DOCUMENTS

| | | |
|---|---|---|
| EP | 3 832 079 A1 | 6/2021 |
| GB | 2 117 938 A | 10/1983 |
| JP | 2000-179326 A | 6/2000 |
| JP | 2003-206724 A | 7/2003 |
| JP | 2004-353529 A | 12/2004 |

* cited by examiner

CONTROL DEVICE, EXHAUST GAS PURIFICATION SYSTEM, AND CONTROL METHOD

TECHNICAL FIELD

The present disclosure relates to a control device, an exhaust passage purification system including the control device, and a control method for directing the opening degree of a throttle valve disposed on an engine having an exhaust passage provided with a DOC and a DPF.

BACKGROUND

Some engines (diesel engines) are equipped with an exhaust gas purification device including a diesel oxidation catalyst (DOC) disposed in an exhaust passage of the engine, and a diesel particulate filter (DPF) disposed downstream of the DOC in the exhaust passage for collecting particulate matters (PM) contained in exhaust gas (see Patent Documents 1 and 2).

When the PM collected by the DPF accumulates and clogs the DPF, the PM collection capacity decreases or the exhaust pressure increases, which may cause deterioration of fuel efficiency. Therefore, every time the amount of PM accumulated reaches a specified amount or the engine operating time elapses for a certain period of time, forced regeneration is performed to remove the PM accumulated on the DPF.

The forced regeneration (automatic regeneration) of the DPF is performed by forcibly increasing the inlet temperature of the DPF. Generally, the DPF inlet temperature is forcibly increased by, after increasing the DOC inlet temperature to a predetermined temperature (about 250° C.) at which the DOC is activated, supplying non-combusted fuel to an exhaust gas treatment device by late-post injection, which is to inject fuel after main combustion injection timing, and oxidizing and heating the non-combusted fuel with the diesel oxidation catalyst (DOC).

In order to increase the DOC inlet temperature to the predetermined temperature, the opening degree of an intake throttle valve disposed in an intake passage of the engine or an exhaust throttle valve disposed in an exhaust passage of the engine is decreased, or the injection amount or the injection timing of non-combusted fuel at early-post injection performed after main combustion injection timing and before late-post injection timing is adjusted.

CITATION LIST

Patent Literature

Patent Document 1: JP2003-206724A
Patent Document 2: JP2004-353529A

SUMMARY

Problems to be Solved

Here, due to hysteresis of the throttle valve (including intake throttle valve and exhaust throttle valve), even when the same opening degree is directed for the throttle valve, there may be an opening difference between the closing-directional actual opening, which is the actual opening degree when the throttle valve is operated in the direction of decreasing the opening degree, and the opening-directional actual opening, which is the actual opening degree when the throttle valve is operated in the direction of increasing the opening degree. Specifically, when the same opening degree is directed, it is possible that the opening-directional actual opening is smaller than the closing-directional actual opening.

If the instructed opening degree of the throttle valve is set based on the closing-directional actual opening, when the throttle valve is operated in the direction of increasing the opening degree, the actual opening degree (opening-directional actual opening) may be smaller than the instructed opening degree, and the flow rate of exhaust gas flowing through the exhaust passage may be smaller than the target value. When the flow rate of exhaust gas flowing through the exhaust passage is smaller than the target value, the temperature of the exhaust passage may increase beyond a limit temperature, and the engine may fail.

In contrast, if the instructed opening degree of the throttle valve is set based on the opening-directional actual opening, it is possible to prevent the engine from failing, but when the throttle valve is operated in the direction of decreasing the opening degree, the actual opening degree (closing-directional actual opening) may be larger than the instructed opening degree, and the flow rate of exhaust gas flowing through the exhaust passage may be greater than the target value. When the flow rate of exhaust gas flowing through the exhaust passage is greater than the target value, it is difficult to increase the DOC inlet temperature during the forced regeneration of the DPF, so that an operating range where the DPF forced regeneration function cannot be exerted may be extended. In other words, an operating range where the DPF forced regeneration function can be exerted may be narrowed.

In view of the above, an object of at least one embodiment of the present invention is to provide a control device whereby it is possible to prevent the operating range where the DPF forced regeneration function can be exerted from being narrowed by eliminating hysteresis of the throttle valve.

Solution to the Problems (1) A control device according to at least one embodiment of the present invention is configured to direct an opening degree of a throttle valve disposed in an intake passage or an exhaust passage of an engine including a DOC disposed in the exhaust passage and a DPF disposed downstream of the DOC in the exhaust passage, and comprises: a hysteresis occurring condition determination unit configured to determine whether a hysteresis occurring condition is met, the hysteresis occurring condition being defined as a condition satisfying at least one of a first condition that a predetermined time elapses after an instructed opening degree of the throttle valve becomes equal to or smaller than a predetermined opening degree, or a second condition that a predetermined time elapses after an engine output of the engine becomes equal to or smaller than a predetermined output; and a hysteresis elimination execution unit configured to cause, if it is determined that the hysteresis occurring condition is met, the throttle valve to execute hysteresis elimination that involves temporarily increasing the opening degree of the throttle valve from the instructed opening degree and then returning the opening degree to the instructed opening degree.

The present inventors have found that when the hysteresis occurring condition is met, an opening difference is highly likely to occur between the instructed opening degree and the actual opening degree due to the hysteresis. More specifically, when the instructed opening degree of the throttle valve is equal to or smaller than the predetermined opening degree, or when the engine output is equal to or smaller than the predetermined output, a temperature difference and a pressure difference occur across the throttle valve. If a certain period of time elapses in an environment where a temperature difference and a pressure difference equal to or greater than a predetermined value occur across the throttle valve, there is a high possibility that hysteresis occurs in the throttle valve, and an opening difference occurs between the instructed opening degree and the actual opening degree. The hysteresis may be caused by the sticking of the throttle valve or the decrease in the followability of the axial force of a motor for opening and closing the throttle valve due to the above-described environment.

According to the above configuration (1), the control device includes a hysteresis occurring condition determination unit and a hysteresis elimination execution unit. The hysteresis occurring condition determination unit determines whether the hysteresis occurring condition is met. As described above, when the hysteresis occurring condition is met, hysteresis is highly likely to occur. The hysteresis elimination execution unit causes, if it is determined that the hysteresis occurring condition is met, the throttle valve to execute hysteresis elimination. The hysteresis elimination involves temporarily increasing the opening degree of the throttle valve from the instructed opening degree and then returning it to the instructed opening degree to calibrate the actual opening degree of the throttle valve to the instructed opening degree when closing. Thus, even if hysteresis occurs, the hysteresis can be eliminated.

As described above, when the flow rate of exhaust gas flowing through the exhaust passage is smaller than the target value, the engine may fail. When the flow rate of exhaust gas flowing through the exhaust passage is greater than the target value, an operating range where the DPF forced regeneration function can be exerted may be narrowed. With the above configuration, since hysteresis is eliminated by the hysteresis elimination, the opening difference between the instructed opening degree and the actual opening degree of the throttle valve is reduced, so that it is possible to prevent the flow rate of exhaust gas flowing through the exhaust passage from becoming excessive or too small compared with the target value. Accordingly, with the above configuration, it is possible to prevent the operating range where the DPF forced regeneration function can be exerted from being narrowed by eliminating hysteresis of the throttle valve.

(2) In some embodiments, the control device described in the above (1) further comprises a time counter for measuring an elapsed time. The hysteresis elimination execution unit is configured to cause the throttle valve to execute the hysteresis elimination when the hysteresis occurring condition is met, and the elapsed time counted by the time counter exceeds a first predetermined time.

When the hysteresis elimination is executed every time the hysteresis occurring condition is met, and the operation of increasing the opening degree of the throttle valve to be larger than the instructed opening degree is repeated, combustion gas or exhaust gas greater than the target value flows downstream of the throttle valve, so that the flow rate of exhaust gas flowing through the exhaust passage may become excessive.

According to the above configuration (2), since the control device is configured to cause the throttle valve to execute the hysteresis elimination when the elapsed time counted by the time counter exceeds the first predetermined time, the hysteresis elimination can be performed at an appropriate timing. By suppressing the excessive hysteresis elimination, it is possible to prevent the flow rate of exhaust gas flowing through the exhaust passage from becoming excessive.

(3) In some embodiments, in the control device described in the above (2), the time counter is configured to start measurement of the elapsed time when the instructed opening degree starts increasing or the instructed opening degree stops decreasing while the hysteresis occurring condition is met.

According to the above configuration (3), if the instructed opening degree is increased while the hysteresis occurring condition is met, there is a high possibility that the actual opening degree does not coincide with the instructed opening degree due to hysteresis. Thus, by starting the measurement of the elapsed time when the instructed opening degree starts increasing while the hysteresis occurring condition is met, the hysteresis elimination can be performed at an appropriate timing.

Meanwhile, if the instructed opening degree stops decreasing while the hysteresis occurring condition is met, the instructed opening degree may increase after stop, and there is a possibility that the actual opening degree does not coincide with the instructed opening degree due to hysteresis. Thus, by starting the measurement of the elapsed time before increasing the instructed opening degree, it is possible to early eliminate possible hysteresis that would occur.

(4) In some embodiments, in the control device described in the above (3), the first predetermined time is set based on at least one of the instructed opening degree during the measurement of the elapsed time by the time counter or the engine output.

According to the above configuration (4), since the first predetermined time is set based on at least one of the instructed opening degree during the measurement of the elapsed time by the time counter or the engine output, the hysteresis elimination can be performed at a more appropriate timing.

(5) In some embodiments, in the control device described in the above (3) or (4), the time counter is configured to cancel the measurement of the elapsed time when the hysteresis occurring condition is no longer met during the measurement of the elapsed time.

According to the above configuration (5), it is unnecessary to execute the hysteresis elimination when the hysteresis occurring condition is no longer met during the measurement of the elapsed time. Thus, by canceling the measurement of the elapsed time, it is possible to eliminate unnecessary hysteresis elimination.

(6) In some embodiments, in the control device described in any of the above (3) to (5), the time counter is configured to cancel the measurement of the elapsed time when the instructed opening degree of the throttle valve becomes smaller than the instructed opening degree at start of the measurement by the time counter, or when a change amount of the instructed opening degree in a closing direction with respect to a maximum instructed opening degree of the throttle valve during the measurement of the elapsed time becomes equal to or greater than a predetermined value.

According to the above configuration (6), when the instructed opening degree of the throttle valve becomes smaller than the instructed opening degree at the start of the measurement by the time counter, or when the change amount of the instructed opening degree in the closing direction with respect to the maximum instructed opening degree of the throttle valve during the measurement of the elapsed time becomes equal to or greater than a predetermined value, the actual opening degree of the throttle valve is calibrated to the instructed opening degree as in the hysteresis elimination, so that it is unnecessary to execute the hysteresis elimination. Thus, by canceling the measurement of the elapsed time by the time counter when the instructed opening degree of the throttle valve becomes smaller than the instructed opening degree at the start of the measurement by the time counter, or when the change amount of the instructed opening degree in the closing direction with respect to the maximum instructed opening degree of the throttle valve during the measurement of the elapsed time becomes equal to or greater than a predetermined value, it is possible to eliminate unnecessary hysteresis elimination.

(7) In some embodiments, in the control device described in any of the above (1) to (6), an opening degree increase amount of the throttle valve during the hysteresis elimination is set based on at least one of the instructed opening degree when the hysteresis elimination is executed or the engine output.

If the opening degree increase amount of the throttle valve during the hysteresis elimination is too small, hysteresis may not be eliminated. In contrast, if the opening degree increase amount of the throttle valve during the hysteresis elimination is excessive, the flow rate of exhaust gas flowing through the exhaust passage may become excessive. According to the above configuration (7), since the opening degree increase amount of the throttle valve during the hysteresis elimination is set based on at least one of the instructed opening degree when the hysteresis elimination is executed or the engine output, hysteresis can be eliminated by the hysteresis elimination, and the flow rate of exhaust gas flowing through the exhaust passage can be prevented from becoming excessive.

(8) In some embodiments, in the control device described in any of the above (1) to (7), during the hysteresis elimination, when a ramp is provided between a time when the opening degree of the throttle valve starts increasing from the instructed opening degree and a time when reaching a predetermined opening degree, a ramp is between a time when the opening degree of the throttle valve starts decreasing from the predetermined opening degree and a time when returning to the instructed opening degree, and a time during which the opening degree is kept at the predetermined opening degree is defined as a second predetermined time, the second predetermined time is set based on at least one of the instructed opening degree when the hysteresis elimination is executed or the engine output.

If the second predetermined time is short, hysteresis may not be eliminated. In contrast, if the second predetermined time is long, the flow rate of exhaust gas flowing through the exhaust passage may become excessive. According to the above configuration (8), since the second predetermined time is set based on at least one of the instructed opening degree when the hysteresis elimination is executed or the engine output, hysteresis can be eliminated by the hysteresis elimination, and the flow rate of exhaust gas flowing through the exhaust passage can be prevented from becoming excessive.

(9) In some embodiments, in the wind turbine monitoring device described in the any one of above (1) to (8), the throttle valve comprises an exhaust throttle valve disposed in the exhaust passage.

Since the exhaust throttle valve is disposed in the exhaust passage through which a fluid having higher temperature and higher pressure flows than that flows through the intake passage, a temperature difference and a pressure difference across the throttle valve is greater than the intake throttle valve. Accordingly, the exhaust throttle valve is more likely to experience hysteresis than the intake throttle valve.

Further, if the actual opening degree of the exhaust throttle valve disposed in the exhaust passage is smaller than the instructed opening degree due to hysteresis, the flow rate of exhaust gas flowing through the exhaust passage is smaller than the target value, so that the temperature of the exhaust passage increases beyond a limit temperature. As a result, the exhaust throttle valve may fail due to the heat of exhaust gas flowing through the exhaust passage. According to the above configuration (9), even when the throttle valve is the exhaust throttle valve disposed in the exhaust passage, it is possible to prevent the temperature of the exhaust passage from exceeding the limit temperature by eliminating hysteresis by the hysteresis elimination. Thus, it is possible to prevent the exhaust throttle valve from failing.

(10) An exhaust gas purification system according at least one embodiment of the present invention comprises: the control device described in any of the above (1) to (9); the DOC; the DPF; and the throttle valve.

According to the above configuration (10), since the control device is configured to cause the throttle valve to execute the hysteresis elimination, the exhaust gas purification system can eliminate hysteresis. As hysteresis is eliminated, the difference between the instructed opening degree and the actual opening degree of the throttle valve is reduced, so that it is possible to prevent the flow rate of exhaust gas flowing through the exhaust passage from becoming excessive or too small compared with the target value.

(11) A control method according to at least one embodiment of the present invention is for controlling an opening degree of a throttle valve disposed in an intake passage or an exhaust passage of an engine including a DOC disposed in the exhaust passage and a DPF disposed downstream of the DOC in the exhaust passage, and comprises: a hysteresis occurring condition determination step of determining whether a hysteresis occurring condition is met, the hysteresis occurring condition being defined as a condition satisfying at least one of a first condition that a predetermined time elapses after an instructed opening degree of the throttle valve becomes equal to or smaller than a predetermined opening degree, or a second condition that a predetermined time elapses after an engine output of the engine becomes equal to or smaller than a predetermined output; and a hysteresis elimination execution step of causing, if it is determined that the hysteresis occurring condition is met, the throttle valve to execute hysteresis elimination that involves temporarily increasing the opening degree of the throttle valve from the instructed opening degree and then returning the opening degree to the instructed opening degree.

According to the above method (11), the control method includes a hysteresis occurring condition determination step and a hysteresis elimination execution step. In the hysteresis occurring condition determination step, it is determined whether the hysteresis occurring condition is met. As described above, when the hysteresis occurring condition is met, hysteresis is highly likely to occur. In the hysteresis elimination execution step, if it is determined that the hysteresis occurring condition is met, the throttle valve is caused to execute hysteresis elimination. The hysteresis elimination involves temporarily increasing the opening degree of the throttle valve from the instructed opening degree and then returning it to the instructed opening degree to calibrate the actual opening degree of the throttle valve to the instructed opening degree when closing. Thus, even if hysteresis occurs, the hysteresis can be eliminated.

With the above method, since hysteresis is eliminated by the hysteresis elimination, the opening difference between the instructed opening degree and the actual opening degree of the throttle valve is reduced, so that it is possible to prevent the flow rate of exhaust gas flowing through the exhaust passage from becoming excessive or too small compared with the target value. Accordingly, with the above method, it is possible to prevent the operating range where the DPF forced regeneration function can be exerted from being narrowed by eliminating hysteresis of the throttle valve.

Advantageous Effects

At least one embodiment of the present invention provides a control device whereby it is possible to prevent the operating range where the DPF forced regeneration function can be exerted from being narrowed by eliminating hysteresis of the throttle valve.

DETAILED DESCRIPTION

Figure 1:
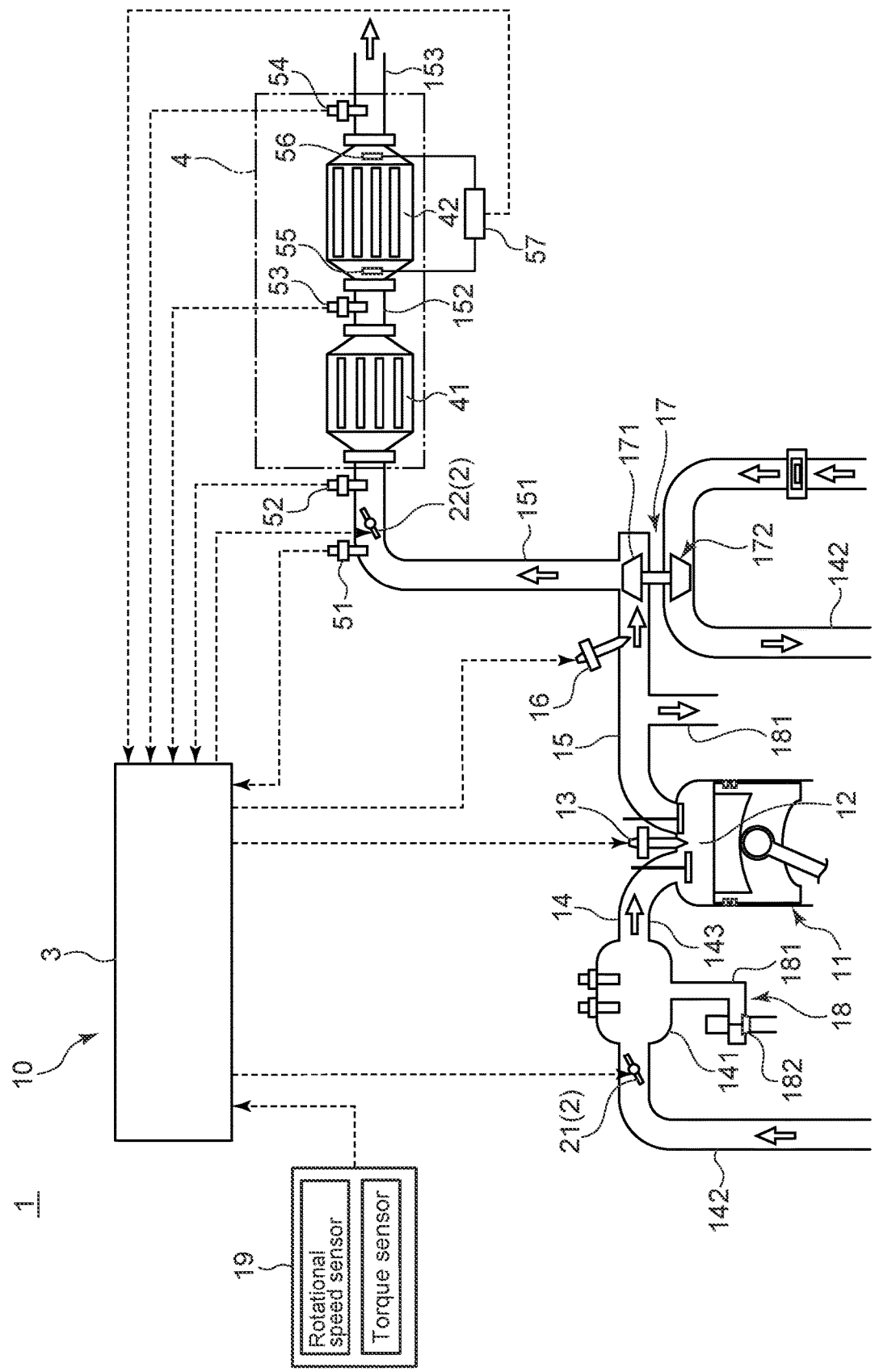
FIG. 1 is a schematic configuration diagram showing an example of overall configuration of an engine including a control device according to an embodiment of the present invention.

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

FIG. 1 is a schematic configuration diagram showing an example of overall configuration of an engine including a control device according to an embodiment of the present invention.

As shown in FIG. 1, an engine 1 (diesel engine) includes an engine body 11 having a combustion chamber 12 defined by a cylinder head and a cylinder block, a fuel injection valve 13 for injecting non-combusted fuel to the combustion chamber 12, an intake passage 14 of the engine 1, an exhaust passage 15 of the engine 1, a throttle valve 2 disposed in at least one of the intake passage 14 or the exhaust passage 15 of the engine 1, a control device 3 configured to direct the opening degree of the throttle valve 2, and an exhaust gas purification device 4 disposed in the exhaust passage 15 of the engine 1.

As shown in FIG. 1, the fuel injection valve 13 is connected to a common rail (not shown) in which non-combusted fuel (high-pressure fuel) is accumulated, and is configured to inject the non-combusted fuel. Further, the fuel injection valve 13 is configured such that the injection timing of non-combusted fuel and the injection amount of non-combusted fuel are controlled by the control device 3. The intake passage 14 of the engine 1 is a passage for supplying air (combustion gas) outside the engine 1 to the combustion chamber 12. The exhaust passage 15 of the engine 1 is a passage for discharging exhaust gas from the combustion chamber 12 to the outside of the engine 1. In main injection, the non-combusted fuel injected from the fuel injection valve 13 to the combustion chamber 12 is mixed with the air (combustion gas) fed from the intake passage 14, and is then combusted in the combustion chamber 12. The exhaust gas after combustion in the combustion chamber 12 is discharged to the outside of the engine 1 through the exhaust passage 15.

The throttle valve 2 includes at least one of an intake throttle valve 21 disposed in the intake passage 14 or an exhaust throttle valve 22 disposed in the exhaust passage 15, as shown in FIG. 1. In the illustrated embodiment, the engine 1 includes both the intake throttle valve 21 and the exhaust throttle valve 22. In another embodiment, the engine 1 includes only one of the intake throttle valve 21 or the exhaust throttle valve 22.

Each of the intake throttle valve 21 and the exhaust throttle valve 22 has a motor and an actuator (not shown) operated in response to a signal transmitted from the control device 3, and is configured to change the opening degree in accordance with the instructed opening degree (instructed opening degree I, second instructed opening degree H) directed by the control device 3. The intake throttle valve 21 changes the opening degree in accordance with the instructed opening degree (instructed opening degree I, second instructed opening degree H) directed by the control device 3 to adjust the flow rate of the air (combustion gas) fed to the combustion chamber 12. The exhaust throttle valve 22 changes the opening degree in accordance with the instructed opening degree (instructed opening degree I, second instructed opening degree H) directed by the control device 3 to adjust the flow rate of exhaust gas flowing downstream of the exhaust throttle valve 22 in the exhaust passage 15.

As shown in FIG. 1, the exhaust gas purification device 4 is a device for purifying exhaust gas discharged from the engine body 11 and includes a diesel oxidation catalyst (DOC) 41 disposed in the exhaust passage 15, and a diesel particulate filter (DPF) 42 disposed downstream of the DOC 41 in the exhaust passage 15. The DPF 42 is configured to collect particulate matters (PM) such as soot contained in exhaust gas discharged from the engine body 11. In the illustrate embodiment, the DOC 41 is disposed downstream of the exhaust throttle valve 22 in the exhaust passage 15.

The DOC 41 has a ceramic or metallic body whose outer shape is formed into a cylindrical or rectangular shape with honeycomb-shape openings, and an oxidation catalyst supported on the inner surface of the main body. The DOC 41 has a function of, through the progress of oxidation with the oxidation catalyst, oxidizing and removing non-combusted fuel (HC) and carbon monoxide (CO) in exhaust gas passing through the DOC 41, and a function of oxidizing nitrogen monoxide (NO) in exhaust gas to produce nitrogen dioxide ($NO_2$) which can combust and remove the PM through reaction with the PM collected by the DPF 42. Further, in the forced regeneration of the DPF, the DOC 41 has a function of heating exhaust gas passing through the DOC 41 by the heat generated by oxidation of non-combusted fuel in the exhaust gas to increase the inlet temperature of the DPF 42.

The DPF 42 has an outer shape formed into a cylindrical or rectangular shape with honeycomb-shaped openings. The DPF 42 is configured such that adjacent openings are alternately closed on the inlet side and the outlet side and exhaust gas passes through the filtration wall (filter). Thus, the PM in exhaust gas is removed when the exhaust gas passes through the filtration wall of the DPF 42. The DPF 42 may support an oxidation catalyst on the inner surface.

The exhaust gas fed to the exhaust gas purification device 4 is, after non-combusted fuel (HC) and carbon monoxide (CO) in the exhaust gas are removed by the DOC 41, and the PM contained in the exhaust gas is removed by the DPF 42, discharged to the outside of the engine 1.

In the illustrated embodiment, as shown in FIG. 1, the exhaust passage 15 includes a first exhaust pipe 151 connecting the exhaust port of the engine body 11 and the upstream side of the DOC 41, a second exhaust pipe 152 connecting the downstream side of the DOC 41 and the upstream side of the DPF 42, and a third exhaust pipe 153 connected to the downstream side of the DPF 42 and having an outlet for discharging exhaust gas. The exhaust throttle valve 22 is disposed in the first exhaust pipe 151.

As shown in FIG. 1, the first exhaust pipe 151 is provided with an exhaust pressure sensor 51 for detecting the pressure in the vicinity of the exhaust throttle valve 22 as the pressure of exhaust gas discharged from the combustion chamber 12, and a DOC inlet temperature sensor 52 for detecting the inlet temperature of the DOC 41 as the temperature of exhaust gas discharged from the combustion chamber 12. As shown in FIG. 1, the second exhaust pipe 152 is provided with a DPF inlet temperature sensor 53 for detecting the inlet temperature of the DPF 42. As shown in FIG. 1, the third exhaust pipe 153 is provided with a DPF outlet temperature sensor 54 for detecting the outlet temperature of the DPF 42. The DPF 42 is provided with a DPF inlet pressure sensor 55, a DPF outlet pressure sensor 56, and a DPF differential pressure sensor 57. Signals relating to the pressure of exhaust gas, the inlet temperature of the DOC 41, the inlet temperature of the DPF 42, the outlet temperature of the DPF 42, and the differential pressure of the DPF 42 measured by these sensors are input to the control device 3 via an input/output unit 31 (see FIG. 2).

Further, in the illustrated embodiment, the intake passage 14 includes an intake manifold 141, a first intake pipe 142 connected to the upstream side of the intake manifold, and a second intake pipe 143 connecting the downstream side of the intake manifold 141 and the supply port of the engine body 11. The intake throttle valve 21 is disposed in the first intake pipe 142.

The control device 3 is configured to acquire the engine output of the engine 1.

In the illustrated embodiment, as shown in FIG. 1, the engine 1 further includes an engine output detection device 19 including a rotational speed sensor for detecting the rotational speed of a shaft (rotational shaft member) (not shown) connected to the engine body 11, and a torque sensor for detecting the torque of the shaft. The control device 3 is connected to the engine output detection device 19, and is configured to acquire the measurement value of the rotational speed sensor and the measurement value of the torque sensor from the engine output detection device 19, and calculate the engine output of the engine 1 from the measurement value of the rotational speed sensor and the measurement value of the torque sensor. The method of acquiring the engine output is not limited to the above method. For example, the engine output of the engine 1 may be detected from the rotational speed of the engine 1 and the fuel injection amount.

The control device 3 (ECU device) is an electronic control unit which controls the engine 1. The control device 3 may comprise a microcomputer including a central processing unit (CPU), a random access memory (RAM), a read only memory (ROM), and an I/O interface. Further, the control device 3 is configured to perform control based on the signals measured by the sensors on the fuel injection valve 13, the intake throttle valve 21, and the exhaust throttle valve 22.

Figure 2:
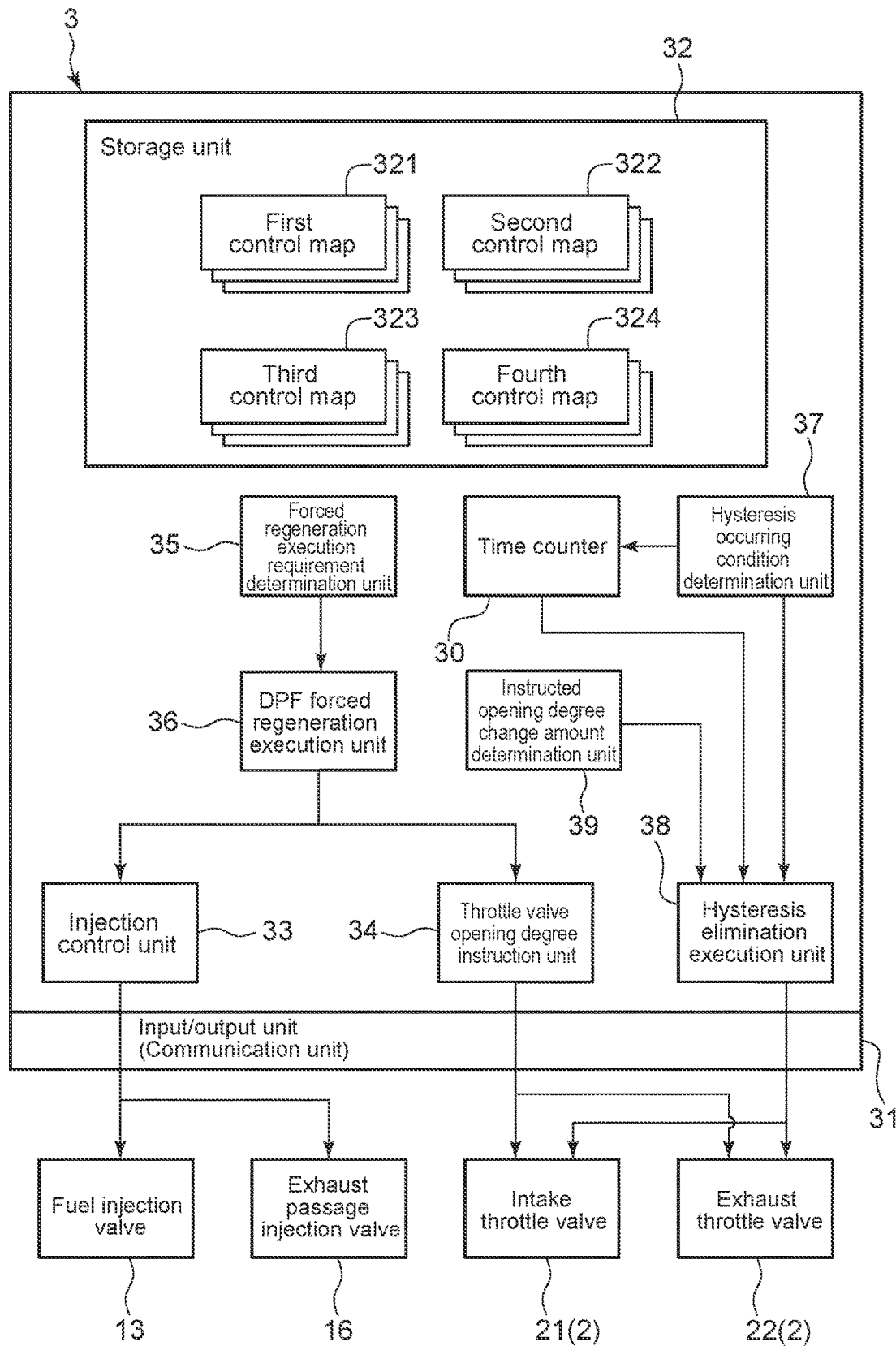
FIG. 2 is a block diagram showing an example of the control device according to an embodiment of the present invention.

FIG. 2 is a block diagram showing an example of the control device according to an embodiment of the present invention. As shown in FIG. 2, the control device 3 includes the input/output unit 31 described above, a storage unit 32, an injection control unit 33 for controlling injection of the fuel injection valve 13, and a throttle valve opening degree instruction unit 34 for controlling the opening of the throttle valve 2 (intake throttle valve 21, exhaust throttle valve 22).

The injection control unit 33 is configured to control the injection timing of non-combusted fuel and the injection amount of non-combusted fuel injected by the fuel injection valve 13. Specifically, as shown in FIG. 2, the storage unit 32 previously stores a first control map 321 in which the engine rotational speed and the air supply amount to the combustion chamber 12 are used as input values, and the injection timing of non-combusted fuel and the injection amount of non-combusted fuel are used as output values. The first control map 321 is composed of a plurality of control maps corresponding to each of the injection modes such as main injection, early-post injection, and late-post injection. The injection control unit 33 instructs the fuel injection valve 13 on the injection timing of non-combusted fuel and the injection amount of non-combusted fuel acquired from the engine rotational speed and the air supply amount to the combustion chamber 12, based on the first control map 321 corresponding to the injection mode.

Figure 3:
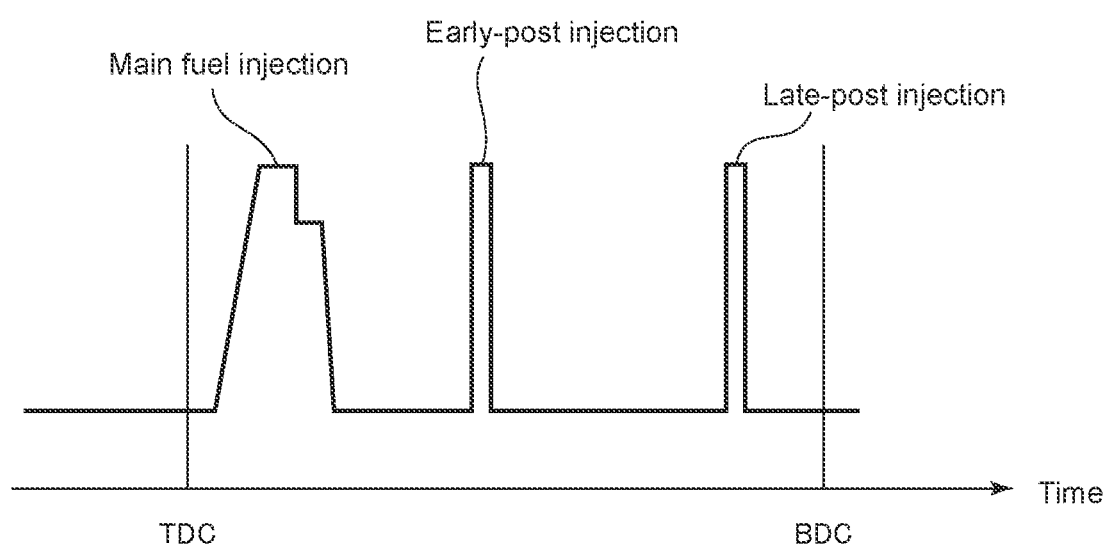
FIG. 3 is a diagram for describing early-post injection and late-post injection.

FIG. 3 is a diagram for describing early-post injection and late-post injection. "TDC" in FIG. 3 indicates that the piston of the engine body 11 is located at the top dead center, and "BDC" indicates that the piston of the engine body 11 is located at the bottom dead center.

As shown in FIG. 3, "early-post injection" described above is injection mode in which fuel is injected into the combustion chamber 12 after main injection and at a timing contributing to combustion in the combustion chamber 12. As shown in FIG. 3, "late-post injection" is injection mode in which fuel is injected into the combustion chamber 12 after main injection and early-post injection and at a timing not contributing to combustion in the combustion chamber 12. In late-post injection, exhaust gas discharged from the combustion chamber 12 by fuel injection into the combustion chamber 12 is heated, and non-combusted fuel is supplied to the DOC 41.

The throttle valve opening degree instruction unit 34 is configured to control the opening degree of the throttle valve 2 (intake throttle valve 21 and exhaust throttle valve 22). Specifically, as shown in FIG. 2, the storage unit 32 previously stores a second control map 322 in which the engine rotational speed and the air supply amount to the combustion chamber 12 are used as input values, and the instructed opening degree I of the throttle valve 2 is used as an output value. The second control map 322 is composed of a plurality of control maps corresponding to each of the intake throttle valve 21 and the exhaust throttle valve 22. The throttle valve opening degree instruction unit 34 instructs the throttle valve 2 on the instructed opening degree I of the throttle valve 2 acquired from the engine rotational speed and the air supply amount to the combustion chamber 12, based on the second control map 322 corresponding to each throttle valve.

The DPF forced regeneration function will now be described.

A part of the PM removed by the DPF 42 is combusted by hot exhaust gas discharged from the combustion chamber 12 during the operation of the engine (continuous regeneration), while the remainder of the PM accumulates in the filtration wall of the DPF 42. Therefore, the exhaust gas purification device 4 provided with the DPF 42 needs to exert a forced regeneration function of forcibly combusting the PM accumulated in the filtration wall of the DPF 42 to regenerate the filtration wall. The forced regeneration function includes an automatic regeneration function automatically executed by the control device 3 when a predetermined forced regeneration execution condition is satisfied, and a manual regeneration function executed by manual operation. Examples of the predetermined forced regeneration execution condition include: the estimated value of the PM accumulation amount on the filtration wall of the DPF 42 exceeding a predetermined value; the operation time of the engine body 11 exceeding a predetermined time; and the cumulative of the fuel injection amount of the fuel injection valve 13 exceeding a predetermined amount. The PM accumulation amount can be estimated by detecting differential pressure between the upstream and downstream sides of the DPF 42 with the DPF differential pressure sensor 57.

As shown in FIG. 2, the control device 3 further includes a forced regeneration execution requirement determination unit 35 configured to determine whether the forced regeneration execution requirement is satisfied, and a DPF forced regeneration execution unit 36 configured to execute forced regeneration (automatic regeneration) of the DPF when the forced regeneration execution requirement is satisfied.

The forced regeneration execution requirement determination unit 35 determines that the forced regeneration execution requirement is satisfied if at least one of the following conditions is satisfied: the estimated value of the PM accumulation amount exceeding a predetermined value; the operation time of the engine body 11 exceeding a predetermined time; or the cumulative of the fuel injection amount of the fuel injection valve 13 exceeding a predetermined amount.

The DPF forced regeneration execution unit 36 instructs the injection control unit 33 and the throttle valve opening degree instruction unit 34 to perform control corresponding to DPF forced regeneration. The injection control unit 33 and the throttle valve opening degree instruction unit 34 perform control in accordance with the control map corresponding to DPF forced regeneration which is different from the control map at normal operation. The injection control unit 33 instructs the fuel injection valve 13 to perform late-post injection. The non-combusted fuel flowing into the DOC 41 by late-post injection is oxidized and heated at the DOC 41 to forcibly raise the inlet temperature of the DPF 42 and forcibly combust the PM.

Instead of or in addition to late-post injection of the fuel injection valve 13, non-combusted fuel may be injected from an exhaust passage injection valve 16 (see FIG. 1) arranged in the exhaust passage 15. In this case, the injection control unit 33 may control not only the fuel injection valve 13 but also injection of non-combusted fuel by the exhaust passage injection valve 16. That is, the injection control unit 33 is configured to control the injection timing of non-combusted fuel and the injection amount of non-combusted fuel injected by the exhaust passage injection valve 16. Further, the storage unit 32 may previously store the control map corresponding to the exhaust passage injection valve 16 as with the first control map 321 corresponding to the fuel injection valve 13.

Figure 4:
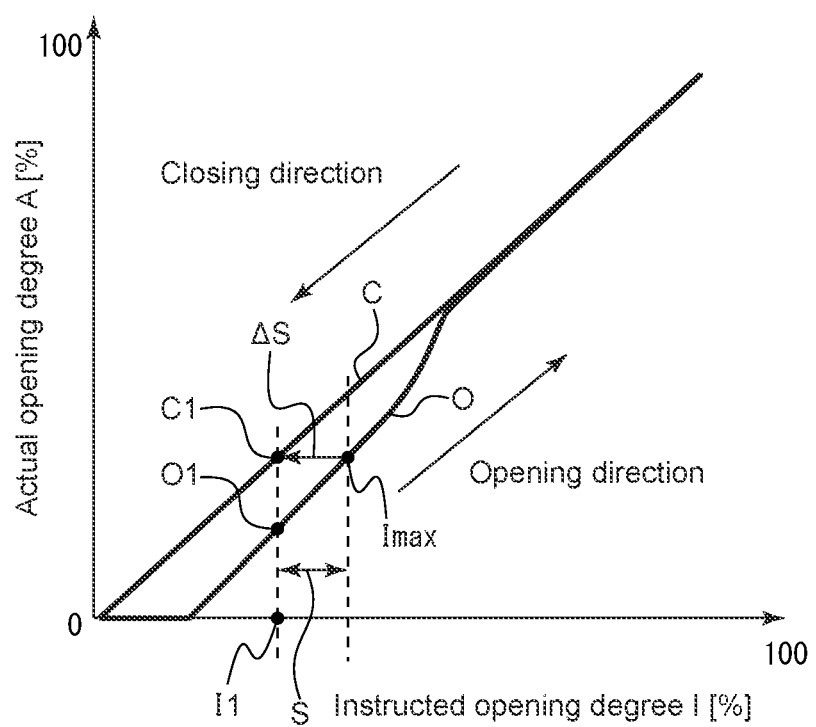
FIG. 4 is a diagram showing a relationship between the instructed opening degree of the throttle valve and the actual opening degree of the throttle valve for describing hysteresis of the throttle valve.

FIG. 4 is a diagram showing a relationship between the instructed opening degree of the throttle valve and the actual opening degree of the throttle valve for describing hysteresis of the throttle valve. In FIG. 4 and FIGS. 5 and 8 to 11 described later, the opening degree (instructed opening degree I and actual opening degree A) of the throttle valve 2 is expressed such that 100% is fully open and 0% is fully closed.

As shown in FIG. 4, due to hysteresis of the throttle valve 2, even when the throttle valve opening degree instruction unit 34 of the control device 3 directs the same instructed opening degree I for the throttle valve 2, a difference may occur between the instructed opening degree I and the actual opening degree A. Here, the actual opening degree A includes a closing-directional actual opening C, which is the actual opening degree when the throttle valve 2 is operated in the direction of decreasing the opening degree (closing direction), and an opening-directional actual opening O, which is the actual opening degree when the throttle valve 2 is operated in the direction of increasing the opening degree (opening direction). The throttle valve opening degree instruction unit 34 is configured to set the instructed opening degree I of the throttle valve 2 based on the closing-directional actual opening C. In other words, it is set such that the closing-directional actual opening C is equal to the instructed opening degree I. In this case, there is a difference between the instructed opening degree I (closing-directional actual opening C) and the actual opening degree A (opening-directional actual opening O) due to hysteresis. For example, as shown in FIG. 4, when the instructed opening degree is I1, the opening-directional actual opening O1 is smaller than the closing-directional actual opening C1.

The present inventors have found that when the hysteresis occurring condition is met, an opening difference is highly likely to occur between the instructed opening degree I and the actual opening degree A due to the hysteresis. The hysteresis occurring condition is defined as a condition satisfying at least one of a first condition that a predetermined time elapses after the instructed opening degree I of the throttle valve 2 becomes equal to or smaller than a predetermined opening degree, or a second condition that a predetermined time elapses after the engine output of the engine 1 becomes equal to or smaller than a predetermined output. More specifically, when the instructed opening degree I of the throttle valve 2 is equal to or smaller than the predetermined opening degree, or when the engine output of the engine 1 is equal to or smaller than the predetermined output, a temperature difference and a pressure difference occur across the throttle valve 2. If a certain period of time elapses in an environment where a temperature difference and a pressure difference equal to or greater than a predetermined value occur across the throttle valve 2, there is a high possibility that hysteresis occurs in the throttle valve 2, and an opening difference occurs between the instructed opening degree I and the actual opening degree A. The hysteresis may be caused by the sticking of the throttle valve 2 or the decrease in the followability of the axial force of a motor for opening and closing the throttle valve 2 due to the above-described environment.

Further, the present inventors have found that when the opening degree of the throttle valve 2 is temporarily increased from the instructed opening degree I directed by the throttle valve opening degree instruction unit 34, the actual opening degree A of the throttle valve 2 is calibrated to the instructed opening degree I (closing-directional actual opening C) when the throttle valve 2 is closed, so that the occurring hysteresis can be eliminated. For example, as shown in FIG. 4, when the instructed opening degree I is I1 and the actual opening degree A is the opening-directional actual opening O1, the actual opening degree A can be calibrated to the closing-directional actual opening C1 by opening the throttle valve 2 more than the instructed opening degree change amount (predetermined value S) corresponding to the hysteresis and then closing the throttle valve 2.

As shown in FIG. 2, the control device 3 further includes a hysteresis occurring condition determination unit 37 and a hysteresis elimination execution unit 38.

The hysteresis occurring condition determination unit 37 is configured to determine whether the hysteresis occurring condition is met. Specifically, the hysteresis occurring condition determination unit 37 is configured to determine whether at least one of the first condition or the second condition is met. The hysteresis occurring condition determination unit 37 may be configured to determine only one of the first condition or the second condition.

In some embodiments, the predetermined opening degree in the hysteresis occurring condition is 40%, preferably 30%, more preferably 20%. Further, in some embodiments, the predetermined output in the hysteresis occurring condition is 70%, preferably 60%, more preferably 50% when the maximum output is 100%.

As shown in FIG. 2, the hysteresis elimination execution unit 38 is configured to control the opening degree of the throttle valve 2 (intake throttle valve 21 and exhaust throttle valve 22). The hysteresis elimination execution unit 38 is configured to set a second instructed opening degree H, which is the instructed opening degree of the throttle valve 2, based on the closing-directional actual opening C as with the throttle valve opening degree instruction unit 34.

Figure 5:
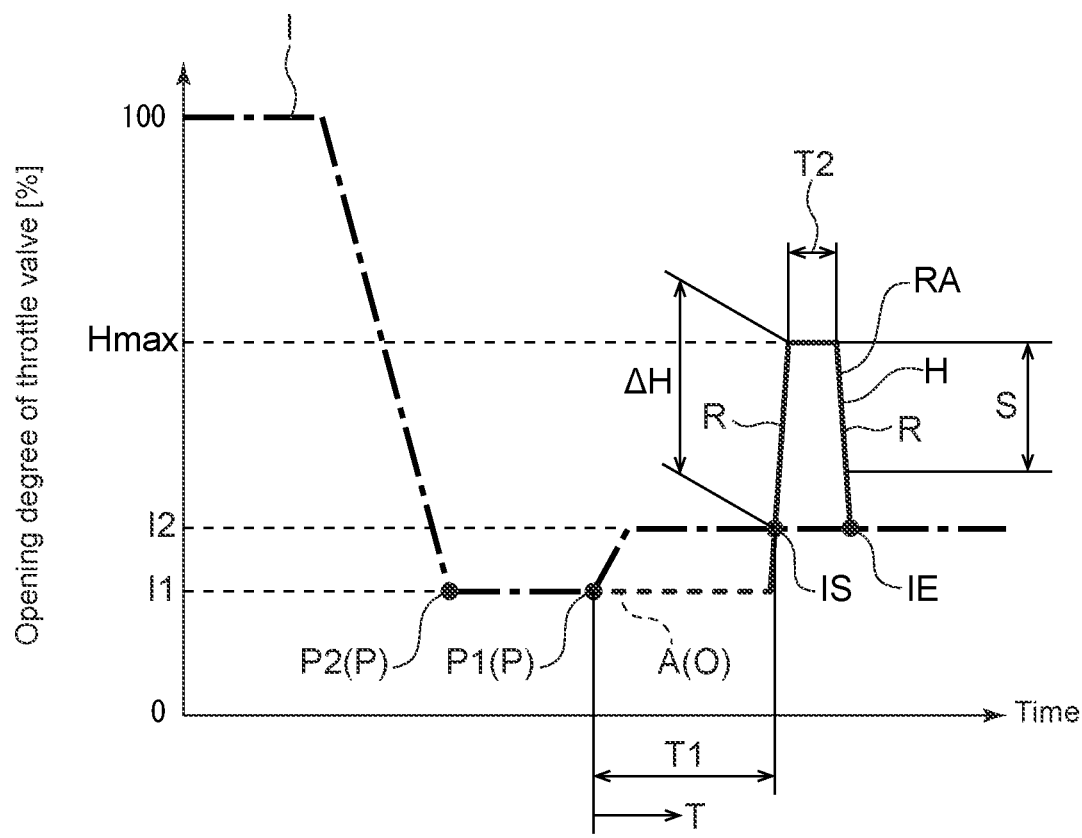
FIG. 5 is a diagram showing a relationship between the time and the opening degree of the throttle valve for describing hysteresis elimination by the throttle valve.

FIG. 5 is a diagram showing a relationship between the time and the opening degree of the throttle valve for describing hysteresis elimination by the throttle valve.

As shown in FIG. 5, the hysteresis elimination execution unit 38 causes, if it is determined that the hysteresis occurring condition is met, the throttle valve 2 to execute hysteresis elimination RA involving temporarily increasing the opening degree of the throttle valve 2 from the instructed opening degree I and then returning it to the instructed opening degree I, as represented by the solid line in the figure.

During the execution of the hysteresis elimination RA, as shown in FIG. 5, the second instructed opening degree H of the throttle valve 2 by the hysteresis elimination execution unit 38 takes priority over the instructed opening degree I by the throttle valve opening degree instruction unit 34 as represented by the chain line in the figure. During the execution of the hysteresis elimination RA, that is, during the period from the start of the hysteresis elimination RA to the end of the hysteresis elimination RA, as shown by the solid line in FIG. 5, the control device 3 instructs the throttle valve 2 to have the second instructed opening degree H. Here, the instructed opening degree IS when the hysteresis elimination RA is executed (started) and the instructed opening degree IE when the hysteresis elimination RA is completed may be equal or different from each other.

The maximum opening degree Hmax of the second instructed opening degree H is an opening degree larger by the opening degree increase amount ΔH than the instructed opening degree IS when the hysteresis elimination RA is executed. Here, since the opening degree increase amount ΔH is greater than the instructed opening degree change amount (predetermined value S) corresponding to hysteresis when the hysteresis elimination RA is executed, in the hysteresis elimination RA, by temporarily increasing the opening degree of the throttle valve 2 from the instructed opening degree I (instructed opening degree IS) by the opening degree increase amount ΔH and then decreasing it by about the opening degree increase amount ΔH to return to the instructed opening degree I (instructed opening degree IE), the actual opening degree A can be calibrated to the instructed opening degree I (closing-directional actual opening C). Thus, since the actual opening degree A of the throttle valve 2 is calibrated to the instructed opening degree I, even if hysteresis occurs, the hysteresis can be eliminated.

As shown in FIG. 2, the control device 3 according to some embodiments includes the hysteresis occurring condition determination unit 37 and the hysteresis elimination execution unit 38 as described above. With this configuration, the hysteresis occurring condition determination unit 37 determines whether the hysteresis occurring condition is met. As described above, when the hysteresis occurring condition is met, hysteresis is highly likely to occur. The hysteresis elimination execution unit 38 causes, if it is determined that the hysteresis occurring condition is met, the throttle valve 2 to execute the hysteresis elimination RA. The hysteresis elimination RA involves temporarily increasing the opening degree of the throttle valve 2 from the instructed opening degree I and then returning it to the instructed opening degree I to calibrate the actual opening degree A of the throttle valve 2 to the instructed opening degree I when closing. Thus, even if hysteresis occurs, the hysteresis can be eliminated.

As described above, when the flow rate of exhaust gas flowing through the exhaust passage 15 is smaller than the target value, the engine body 11 (engine) may fail. In contrast, when the flow rate of exhaust gas flowing through the exhaust passage 15 is greater than the target value, an operating range where the forced regeneration function of the DPF 42 can be exerted may be narrowed. With the above configuration, since hysteresis is eliminated by the hysteresis elimination RA, the opening difference between the instructed opening degree I and the actual opening degree A of the throttle valve 2 is reduced, so that it is possible to prevent the flow rate of exhaust gas flowing through the exhaust passage 15 from becoming excessive or too small compared with the target value. Accordingly, with the above configuration, it is possible to prevent the operating range where the forced regeneration function of the DPF 42 can be exerted from being narrowed by eliminating hysteresis of the throttle valve 2.

Figure 6:
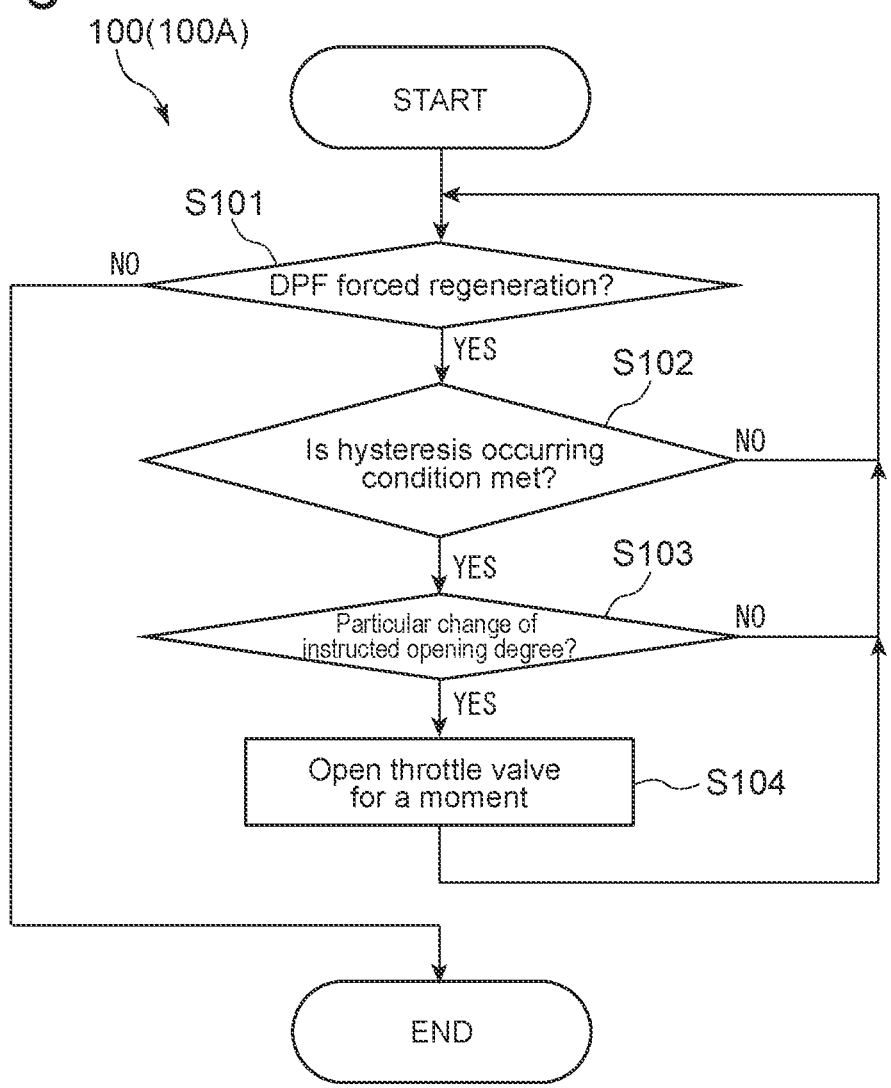
FIG. 6 is a flowchart of a control method according to an embodiment of the present invention.
Figure 7:
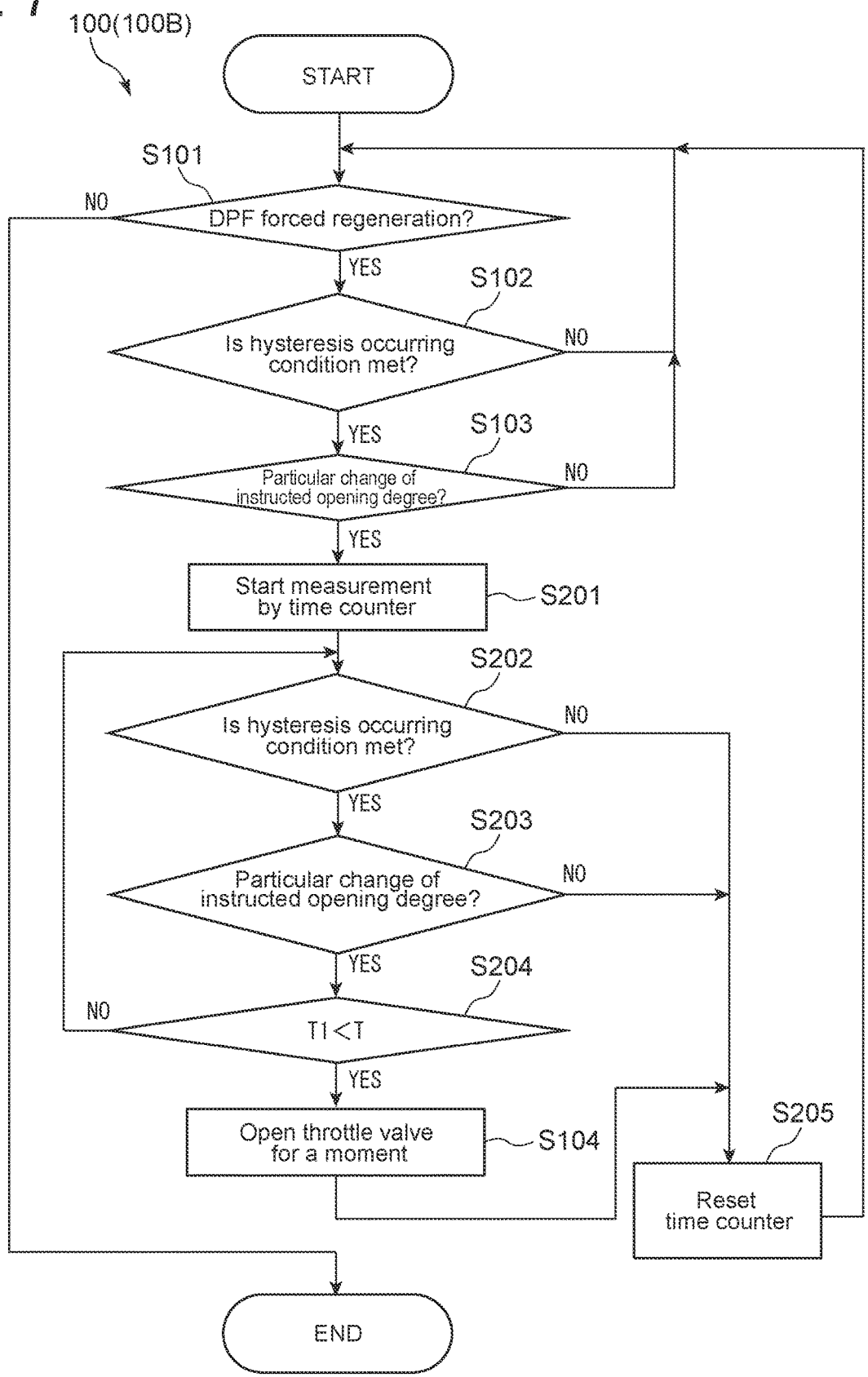
FIG. 7 is a flowchart of a control method according to another embodiment of the present invention.

FIG. 6 is a flowchart of the control method according to an embodiment of the present invention. FIG. 7 is a flowchart of the control method according to another embodiment of the present invention. FIGS. 8 to 11 are diagrams showing a relationship between the time and the opening degree of the throttle valve for describing the case where the time counter cancels the measurement of elapsed time. The opening degrees I1 to I8 in FIG. 5 and FIGS. 8 to 11 are equal to or smaller than the predetermined opening degree in the hysteresis occurring condition described above.

Hereinafter, with reference to FIGS. 6 and 11, the configuration of the control device 3 and the control method 100 (100A, 100B) according to some embodiments will be described. The control method 100 (100A, 100B) is a control method for directing the opening degree of the throttle valve 2 of the engine 1. The control device 3 further includes a time counter 30 and an instructed opening degree change amount determination unit 39. The flowcharts of FIG. 6 and FIG. 7 mainly target the exhaust throttle valve 22. A part of the control method 100 excluding a step S101, which will be described later, can be applied to the intake throttle valve 21.

As shown in FIG. 6, the control method 100 (100A) includes a step S101, a hysteresis occurring condition determination step S102, an instructed opening degree determination step S103, and a hysteresis elimination execution step S104.

In the step S101, it is checked whether the DPF is under forced regeneration. When the DPF is not under forced regeneration ("No" in step S101), the instructed opening degree I of the exhaust throttle valve 22 is fully open or almost fully open, so that the hysteresis does not occur. Therefore, the hysteresis elimination RA is not executed. The control device 3 can check whether the DPF is under forced regeneration. In the case of the intake throttle valve 21, the step S101 is unnecessary. This is because the intake throttle valve 21 opens and closes both during the forced regeneration of the DPF and during the normal operation.

Then, if the DPF is under forced regeneration ("Yes" in step S101), the hysteresis occurring condition determination step S102 is performed to determine whether the hysteresis occurring condition is met. In the control device 3, the hysteresis occurring condition determination unit 37 performs the determination in the hysteresis occurring condition determination step S102.

If it is determined that the hysteresis occurring condition is met ("Yes" in step S102), the instructed opening degree determination step S103 is performed to determine whether a particular change occurs in the instructed opening degree I. In the illustrated embodiment, whether the particular change occurs in the instructed opening degree I is determined based on history of the instructed opening degree I within the latest predetermined period for determining whether the particular change occurs in the instructed opening degree I. The particular change includes at least one of that the instructed opening degree I starts increasing or that the instructed opening degree I stops decreasing. In the control device 3, the instructed opening degree change amount determination unit 39 performs the determination in the instructed opening degree determination step S103. In other embodiments, the instructed opening degree determination step S103 may not be included. Further, in other embodiments, when the instructed opening degree I significantly increases or decreases, it may be determined whether the particular change occurs in the instructed opening degree I by using an average value, for example.

If it is determined that the hysteresis occurring condition is not met ("No" in step S102), and it is determined that the particular change does not occur in the instructed opening degree I ("No" in step S103), the determinations in the steps S101 to S103 are repeated until the condition is met.

If the particular change occurs in the instructed opening degree I, more specifically, if it is determined that the particular change occurs in the instructed opening degree I ("Yes" in step S103), the hysteresis elimination execution step S104 is performed to cause the throttle valve 2 to execute the hysteresis elimination RA involving temporarily increasing the opening degree of the throttle valve 2 from the instructed opening degree I and then returning it to the instructed opening degree I. In the control device 3, the hysteresis elimination execution unit 38 causes the throttle valve 2 to execute the hysteresis elimination RA. After the hysteresis elimination execution step S104, the determinations in the steps S101 to S103 are performed again.

As shown in FIG. 7, the control method 100 (100B) includes the step S101, the hysteresis occurring condition determination step S102, the instructed opening degree determination step S103, and the hysteresis elimination execution step S104. Further, as shown in FIG. 7, the control method 100 (100B) further includes steps S201 to S205.

In the control method 100A, if it is determined that the conditions are satisfied in the steps S101 to S103, the hysteresis elimination execution step S104 is performed. In contrast, in the control method 100B, as shown in FIG. 7, if it is determined that the conditions are satisfied in the steps S101 to S103, the measurement of an elapsed time T starts, and when the elapsed time T exceeds a first predetermined time T1, the hysteresis elimination execution step S104 is performed. As described above, in the case of the intake throttle valve 21, the step S101 is unnecessary.

As shown in FIG. 7, if the particular change occurs in the instructed opening degree I ("Yes" in step S103), the measurement of the elapsed time T (see FIG. 5) since the particular change occurs in the instructed opening degree I is started (S201). In the embodiment shown in FIG. 5, the elapsed time T is an elapsed time from the measurement start point P at which the measurement is started. The measurement start point P indicates a point that satisfies the determination conditions in the steps S101 to S103. The measurement start point P includes a measurement start point Pb at which the instructed opening degree I starts increasing while the hysteresis occurring condition is met, and a measurement start point P2 at which the instructed opening degree I stops decreasing while the hysteresis occurring condition is met. In the control device 3, the time counter 30 measures the elapsed time T.

During the measurement of the elapsed time T, the hysteresis occurring condition determination step S202 is performed to determine whether the hysteresis occurring condition is met. In the control device 3, the hysteresis occurring condition determination unit 37 performs the determination in the hysteresis occurring condition determination step S202.

Figure 8:
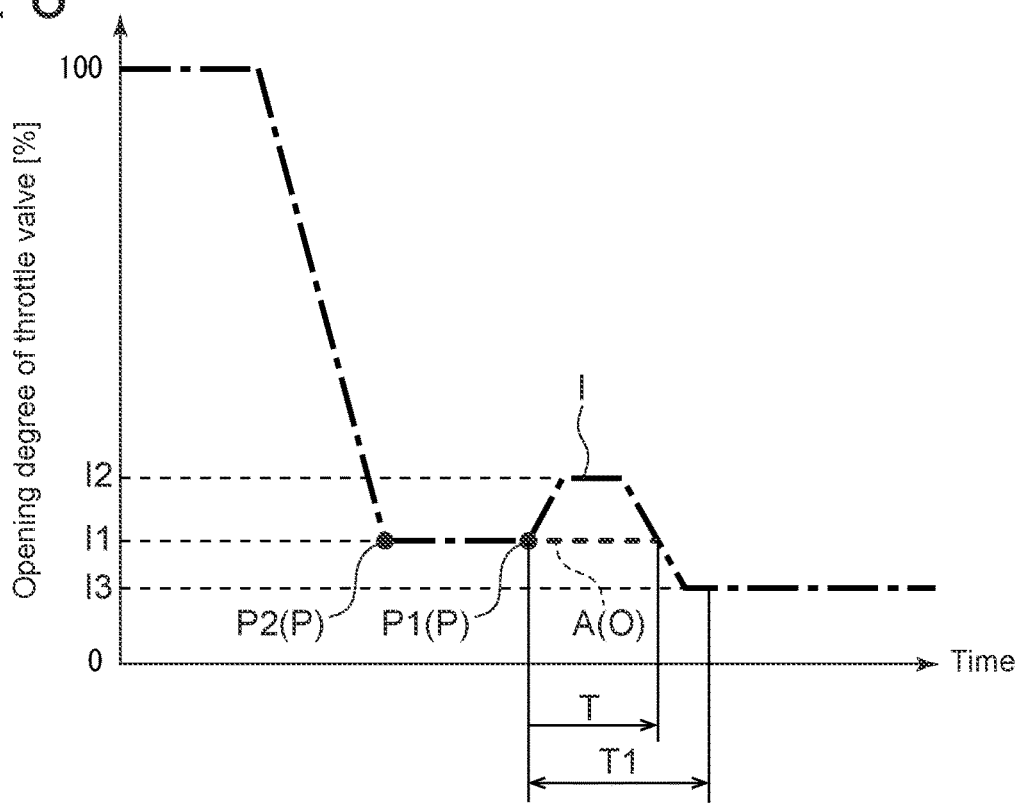
FIG. 8 is a diagram showing a relationship between the time and the opening degree of the throttle valve for describing the case where the time counter cancels the measurement of elapsed time.
Figure 9:
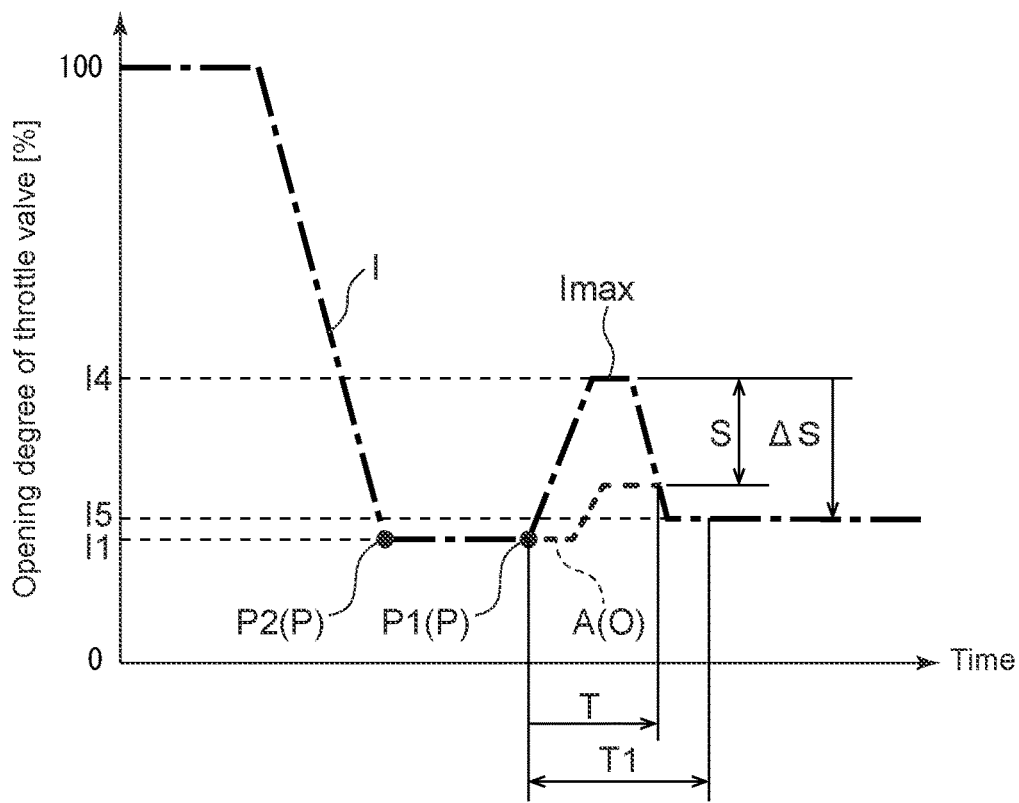
FIG. 9 is a diagram showing a relationship between the time and the opening degree of the throttle valve for describing the case where the time counter cancels the measurement of elapsed time.
Figure 10:
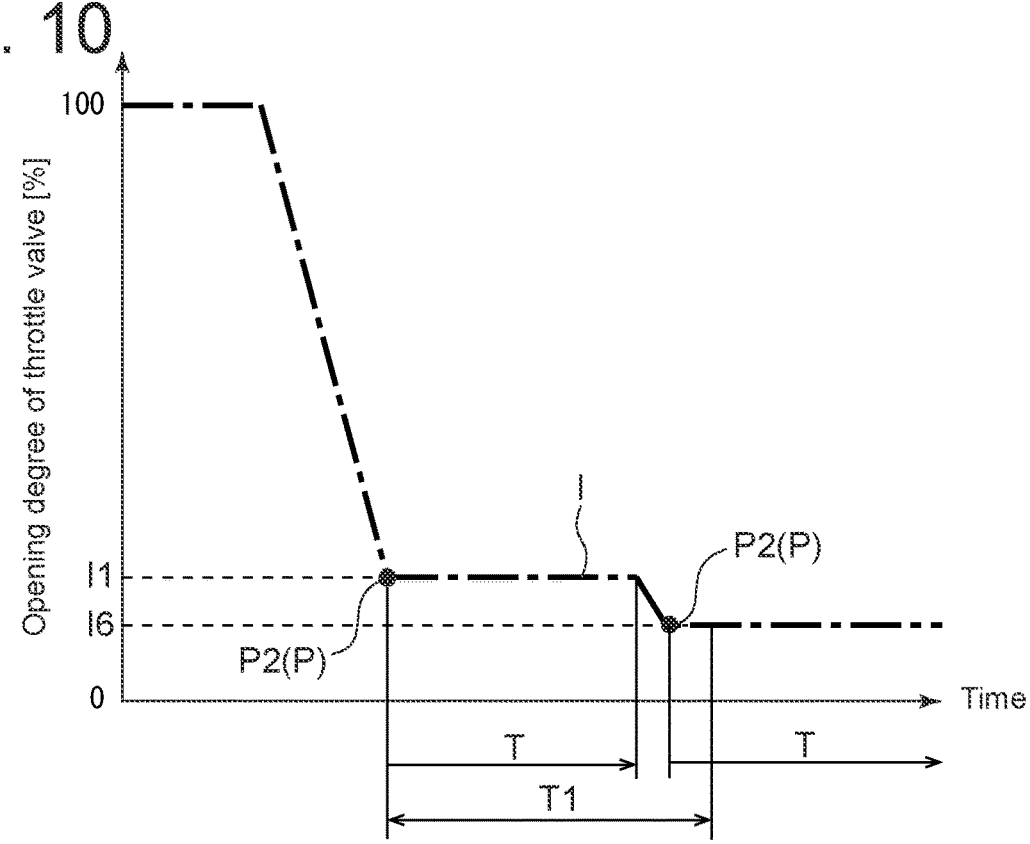
FIG. 10 is a diagram showing a relationship between the time and the opening degree of the throttle valve for describing the case where the time counter cancels the measurement of elapsed time.
Figure 11:
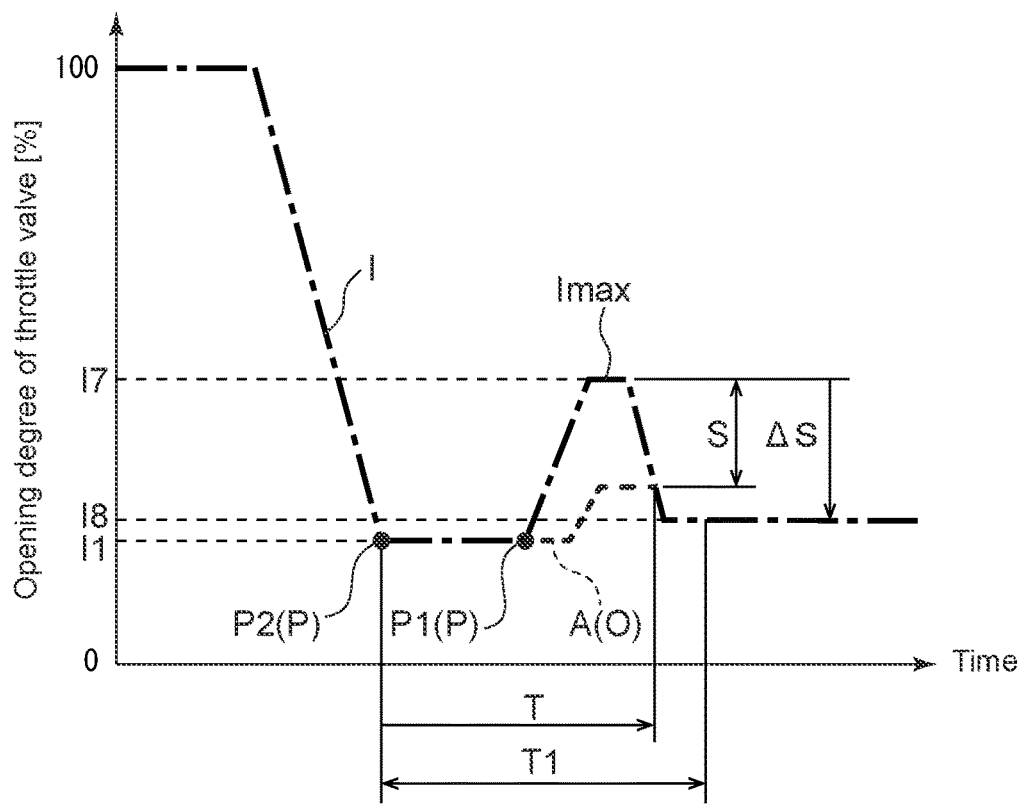
FIG. 11 is a diagram showing a relationship between the time and the opening degree of the throttle valve for describing the case where the time counter cancels the measurement of elapsed time.

Further, as shown in FIGS. 8 to 11, the instructed opening degree change amount determination step S203 is performed to determine at least one of whether the instructed opening degree I of the throttle valve 2 after the start of the measurement of the elapsed time T is equal to or larger than the instructed opening degree I at the start of the measurement of the elapsed time T (instructed opening degree I at measurement start point P) or whether the change amount ΔS of the instructed opening degree I in the closing direction with respect to the maximum instructed opening degree Imax of the throttle valve 2 during the measurement of the elapsed time T is smaller than the predetermined value S. In the control device 3, the instructed opening degree change amount determination unit 39 performs the determination in the instructed opening degree change amount determination step S203. Here, as shown in FIGS. 4, 9 and 11, the change amount ΔS is positive in the closing direction of the instructed opening degree I. The case where it is determined that the condition is satisfied in the instructed opening degree change amount determination step S203 indicates that the instructed opening degree I of the throttle valve 2 after the start of the measurement of the elapsed time T is equal to or larger than the instructed opening degree I at the start of the measurement of the elapsed time T (instructed opening degree I at measurement start point P), and the change amount ΔS of the instructed opening degree I in the closing direction with respect to the maximum instructed opening degree Imax of the throttle valve 2 during the measurement of the elapsed time T is smaller than the predetermined value S.

If it is determined that conditions are satisfied in the hysteresis occurring condition determination step S202 and the instructed opening degree change amount determination step S203 ("Yes" in steps S202 and S203), and the elapsed time T exceeds the first predetermined time T1 ("YES" in S204), the hysteresis elimination execution step S104 is performed. In the control device 3, the time counter 30 compares the elapsed time T with the first predetermined time T1, and the hysteresis elimination execution unit 38 causes the throttle valve 2 to execute the hysteresis elimination RA. After the hysteresis elimination execution step S104, after the elapsed time T is reset (step S205), the determinations in the steps S101 to S103 are performed again. In the control device 3, the time counter 30 resets the elapsed time T. In another embodiment, if it is determined that the condition is satisfied in at least one of the hysteresis occurring condition determination step S202 or the instructed opening degree change amount determination step S203, and the elapsed time T exceeds the first predetermined time T1, the hysteresis elimination execution step S104 may be performed.

During the measurement of the elapsed time T, that is, when the elapsed time T is equal to or less than the first predetermined time T1 ("No" in S204), the determinations in the hysteresis occurring condition determination step S202 and the instructed opening degree change amount determination step S203 are repeated. Further, if it is determined that the condition is not satisfied in the hysteresis occurring condition determination step S202, that is, when the hysteresis occurring condition is no longer satisfied during the measurement of the elapsed time T ("No" in step S202), after the elapsed time T is reset (step S205), the determinations in the steps S101 to S103 are performed again. Further, if it is determined that the condition is not satisfied in the instructed opening degree change amount determination step S203, that is, when the change amount ΔS of the instructed opening degree I in the closing direction with respect to the maximum instructed opening degree Imax of the throttle valve 2 during the measurement of the elapsed time T becomes equal to or greater than the predetermined value S ("No" in step S203), after the elapsed time T is reset (step S205, the determinations in the steps S101 to S103 are performed again.

In some embodiments, the control device 3 includes the time counter 30 for measuring the elapsed time T. Further, the hysteresis elimination execution unit 38 is configured to cause the throttle valve 2 to execute the hysteresis elimination RA when the hysteresis occurring condition is met, and the elapsed time T exceeds the first predetermined time T1. When the hysteresis elimination RA is executed every time the hysteresis occurring condition is met, and the operation of increasing the opening degree of the throttle valve 2 to be larger than the instructed opening degree I is repeated, combustion gas or exhaust gas greater than the target value flows downstream of the throttle valve 2, so that the flow rate of exhaust gas flowing through the exhaust passage 15 may become excessive. With the above configuration, since the control device 3 is configured to cause the throttle valve 2 to execute the hysteresis elimination RA when the elapsed time T counted by the time counter 30 exceeds the first predetermined time T1, the hysteresis elimination RA can be performed at an appropriate timing. By suppressing the excessive hysteresis elimination RA, it is possible to prevent the flow rate of exhaust gas flowing through the exhaust passage 15 from becoming excessive.

In some embodiments, the time counter 30 is configured to start the measurement of the elapsed time T when the instructed opening degree I starts increasing or the instructed opening degree I stops decreasing while the hysteresis occurring condition is met. In the illustrated embodiment, whether the particular change occurs in the instructed opening degree I is determined by the instructed opening degree change amount determination unit 39. In the embodiments shown in FIGS. 8 and 9, the time when the instructed opening degree I starts increasing from the opening degree I1 to the opening degree 12 or 14 larger than I1 is defined as the measurement start point P1 at which the measurement of the elapsed time T starts. Further, in the embodiments shown in FIGS. 10 and 11, the time when the instructed opening degree I decreases to the opening degree I1 is defined as the measurement start point P2 at which the measurement of the elapsed time T starts. Further, in the embodiment shown in FIG. 10, the time when the instructed opening degree I decreases from the opening degree I1 to the opening degree I6 smaller than I1 is also defined as the measurement start point P2 at which the measurement of the elapsed time T starts.

According to the above configuration, as shown in FIGS. 8 and 9, if the instructed opening degree I is increased while the hysteresis occurring condition is met, there is a high possibility that the actual opening degree A does not coincide with the instructed opening degree I due to hysteresis. Thus, by starting the measurement of the elapsed time T when the instructed opening degree I starts increasing (measurement start point P1) while the hysteresis occurring condition is met, the hysteresis elimination RA can be performed at an appropriate timing.

Meanwhile, as shown in FIG. 11, if the instructed opening degree I stops decreasing while the hysteresis occurring condition is met, the instructed opening degree I may increase after stop, and there is a possibility that the actual opening degree A does not coincide with the instructed opening degree I due to hysteresis. Thus, by starting the measurement of the elapsed time before increasing the instructed opening degree I, that it, at the measurement start point P2 earlier than the measurement start point P1, it is possible to early eliminate possible hysteresis that would occur.

In some embodiments, the first predetermined time T1 is set based on at least one of the instructed opening degree I during the measurement of the elapsed time T by the time counter 30 or the engine output of the engine 1. More specifically, the smaller the instructed opening degree I during the measurement of the elapsed time T, or the smaller the engine output of the engine 1, the shorter the first predetermined time T1 is set. That is, when the instructed opening degree I during the measurement of the elapsed time T is I1, the first predetermined time T1 is set shorter than when the instructed opening degree I during the measurement of the elapsed time T is I2 which is greater than I1. The same applies to the engine output.

This is because, for example as shown in FIG. 4, the smaller the instructed opening degree I is, the more likely it is that hysteresis tends to occur, and the opening difference between the instructed opening degree I and the actual opening degree A tends to increase. Similarly, the smaller the engine output of the engine 1 is, the more likely it is that hysteresis tends to occur, and the opening difference between the instructed opening degree I and the actual opening degree A tends to increase. There is a similar tendency for engine output. Therefore, the smaller the instructed opening degree I or the smaller the engine output of the engine 1, the earlier it is necessary to execute the hysteresis elimination RA.

The first predetermined time T1 may be calculated from the control map in which at least one of the instructed opening degree I during the measurement of the elapsed time T or the engine output of the engine 1 is used as an input value, and the first predetermined time T1 is used as an output value. If the instructed opening degree I or the engine output fluctuates during the measurement of the elapsed time T, the maximum value, the minimum value, or the average value may be used as the input value.

With the above configuration, since the first predetermined time T1 is set based on at least one of the instructed opening degree I during the measurement of the elapsed time T by the time counter 30 or the engine output, the hysteresis elimination RA can be performed at a more appropriate timing. Thus, it is possible to reliably prevent the flow rate of exhaust gas flowing through the exhaust passage 15 from becoming excessive or too small compared with the target value.

In some embodiments, the time counter 30 is configured to cancel the measurement of the elapsed time T when the hysteresis occurring condition is no longer met during the measurement of the elapsed time T. In this case, it is unnecessary to execute the hysteresis elimination RA when the hysteresis occurring condition is no longer met during the measurement of the elapsed time T. Thus, by canceling the measurement of the elapsed time T by the time counter 30, it is possible to eliminate unnecessary hysteresis elimination RA.

In some embodiments, as shown in FIGS. 8 and 10, the time counter 30 is configured to cancel the measurement of the elapsed time T when the instructed opening degree I of the throttle valve 2 after the start of the measurement of the elapsed time T becomes smaller than the instructed opening degree I at the start of the measurement of the elapsed time T (instructed opening degree I at measurement start point P). In the embodiments shown in FIGS. 8 and 10, the instructed opening degree I at the measurement start points P1, P2 is I1. Before the elapsed time T exceeds the first predetermined time T1, the instructed opening degree I decreases to I3 or I6 which is smaller than I1, and the measurement of the elapsed time T by the time counter 30 is completed at the time when the instructed opening degree I becomes smaller than I1.

Further, as shown in FIGS. 9 and 11, the time counter 30 is configured to cancel the measurement of the elapsed time T when the change amount $\Delta S$ of the instructed opening degree I (instructed opening degree change amount) in the closing direction with respect to the maximum instructed opening degree Imax of the throttle valve 2 during the measurement of the elapsed time T becomes equal to or greater than the predetermined value S. In the embodiments shown in FIGS. 8 and 10, the maximum instructed opening degree Imax of the throttle valve 2 during the measurement of the elapsed time T is I4 or I7. After the instructed opening degree I reaches the maximum instructed opening degree Imax and before the elapsed time T exceeds the first predetermined time T1, the instructed opening degree I decreases to I5 or I8 which is smaller than an opening degree calculated by subtracting the predetermined value S from the maximum instructed opening degree Imax, and the measurement of the elapsed time T by the time counter 30 is completed at the time when the instructed opening degree I becomes smaller than the calculated opening degree.

In the illustrated embodiment, the predetermined value S corresponding to hysteresis is acquired from the third control map 323 previously stored in the storage unit 32 as shown in FIG. 2. In the third control map 323, at least one of the instructed opening degree I or the engine output at the start of the measurement of the elapsed time T is used as an input value, and the predetermined value S (instructed opening degree change amount) of the throttle valve 2 is used as an output value. In the third control map 323, the smaller the input value, the greater the output value (predetermined value S). That is, when the instructed opening degree I at the start of the measurement of the elapsed time T is I1, the predetermined value S is set greater than when the instructed opening degree I at the start of the measurement of the elapsed time T is I2 which is greater than I1. The same applies to the engine output. In another embodiment, the predetermined value S may be a value obtained by subtracting a constant value from the second instructed opening degree H of the throttle valve 2, which is an output value of a fourth control map 324 described later.

With the above configuration, when the instructed opening degree I of the throttle valve 2 becomes smaller than the instructed opening degree I at the start of the measurement by the time counter 30 (measurement start point P), or when the change amount ΔS of the instructed opening degree I in the closing direction with respect to the maximum instructed opening degree Imax of the throttle valve 2 during the measurement of the elapsed time becomes equal to or greater than the predetermined value S, the actual opening degree A of the throttle valve 2 is calibrated to the instructed opening degree I as in the hysteresis elimination RA, so that it is unnecessary to execute the hysteresis elimination RA. Thus, by canceling the measurement of the elapsed time T by the time counter 30 when the instructed opening degree I of the throttle valve 2 becomes smaller than the instructed opening degree I at the start of the measurement by the time counter 30 (measurement start point P), or when the change amount ΔS of the instructed opening degree I in the closing direction with respect to the maximum instructed opening degree Imax of the throttle valve 2 during the measurement of the elapsed time T becomes equal to or greater than the predetermined value S, it is possible to eliminate unnecessary hysteresis elimination RA.

In some embodiments, the opening degree increase amount ΔH (see FIG. 5) of the throttle valve 2 during the hysteresis elimination RA is set based on at least one of the instructed opening degree IS when the hysteresis elimination RA is executed or the engine output of the engine 1. More specifically, the smaller the instructed opening degree IS when the hysteresis elimination RA is executed, or the smaller the engine output of the engine 1, the greater the opening degree increase amount ΔH and the longer the second predetermined time T2 described later are set. That is, when the instructed opening degree IS at the time of executing the hysteresis elimination RA is I1, the opening degree increase amount ΔH is set greater, and the second predetermined time T2 is set longer than when the instructed opening degree IS at the time of executing the hysteresis elimination RA is I2 which is greater than I1. The same applies to the engine output.

The opening degree increase amount ΔH and the second predetermined time T2, which will be described later, may be calculated from the control map in which at least one of the instructed opening degree IS when the hysteresis elimination RA is executed or the engine output of the engine 1 is used as an input value, and the opening degree increase amount ΔH is used as an output value. More specifically, as shown in FIG. 2, the storage unit 32 previously stores a fourth control map 324 in which at least one of the instructed opening degree IS when the hysteresis elimination RA is executed or the engine output of the engine 1 is used as an input value, and the opening degree increase amount ΔH and the second predetermined time T2 are used as output values. In the fourth control map 324, the smaller the input value, the greater the opening degree increase amount ΔH and the longer the second predetermined time T2 which are the output values.

The fourth control map 324 is composed of a plurality of control maps corresponding to each of the intake throttle valve 21 and the exhaust throttle valve 22. The hysteresis elimination execution unit 38 instructs the throttle valve 2 on the opening degree increase amount ΔH of the throttle valve 2 and the second predetermined time T2 acquired from the instructed opening degree IS when the hysteresis elimination RA is executed or the engine output of the engine 1, based on the fourth control map 324 corresponding to each throttle valve 2. The hysteresis elimination execution unit 38 may instruct the throttle valve 2 on the second instructed opening degree H obtained by adding the opening degree increase amount ΔH to the instructed opening degree IS when the hysteresis elimination RA is executed.

If the opening degree increase amount ΔH of the throttle valve 2 during the hysteresis elimination RA is too small, hysteresis may not be eliminated. In contrast, if the opening degree increase amount ΔH of the throttle valve 2 during the hysteresis elimination RA is excessive, the flow rate of exhaust gas flowing through the exhaust passage 15 may become excessive. With the above configuration, since the opening degree increase amount ΔH of the throttle valve 2 during the hysteresis elimination RA is set based on at least one of the instructed opening degree IS when the hysteresis elimination RA is executed or the engine output of the engine 1, hysteresis can be eliminated by the hysteresis elimination RA, and the flow rate of exhaust gas flowing through the exhaust passage 15 can be prevented from becoming excessive.

In some embodiments, as shown in FIG. 5, during the hysteresis elimination RA, when ramps R are provided between a time when the opening degree of the throttle valve 2 starts increasing from the instructed opening degree IS and a time when the opening degree reaches a predetermined opening degree (maximum opening degree Hmax), and between a time when the opening degree of the throttle valve 2 starts decreasing from the predetermined opening degree (maximum opening degree Hmax) and a time when the opening degree returns to the instructed opening degree IE, and a time during which the opening degree is kept at the predetermined opening degree (maximum opening degree Hmax) is defined as the second predetermined time T2, the second predetermined time T2 is set based on at least one of the instructed opening degree IE when the hysteresis elimination RA is executed or the engine output of the engine 1.

If the second predetermined time T2 is short, hysteresis may not be eliminated. In contrast, if the second predetermined time T2 is long, the flow rate of exhaust gas flowing through the exhaust passage 15 may become excessive. With the above configuration, since the second predetermined time T2 is set based on at least one of the instructed opening degree IS when the hysteresis elimination RA is executed or the engine output of the engine 1, hysteresis can be eliminated by the hysteresis elimination RA, and the flow rate of exhaust gas flowing through the exhaust passage 15 can be prevented from becoming excessive.

In some embodiments, the throttle valve 2 is the exhaust throttle valve 22 disposed in the exhaust passage 15. Since the exhaust throttle valve 22 is disposed in the exhaust passage 15 through which a fluid (exhaust gas) having higher temperature and higher pressure flows than that flows through the intake passage 14, a temperature difference and a pressure difference across the throttle valve 2 is greater than the intake throttle valve 21. Accordingly, the exhaust throttle valve 22 is more likely to experience hysteresis than the intake throttle valve 21. One possible cause of hysteresis is the sticking of the throttle valve 2. Since the upstream side of the exhaust throttle valve 22 is placed in a high temperature and high pressure environment, the sticking is more likely to occur than the intake throttle valve 21. Another possible cause of hysteresis is the followability of the axial force of a motor for opening and closing the throttle valve 2. Since the exhaust throttle valve 22 is disposed in the exhaust passage 15 through which a fluid having higher temperature and higher pressure flows than that flows through the intake passage 14, the motor for opening and closing the exhaust throttle valve 22 is affected by the fluid having higher temperature, and the followability of the axial force decreases compared with the motor for opening and closing the intake throttle valve 21, which may increase hysteresis. Further, since the exhaust throttle valve 22 is made of a material having corrosion resistance (for example, stainless steel) in order to prevent corrosion due to exhaust gas, it has low heat resistance.

Accordingly, when the temperature of the exhaust passage 15 increases beyond a limit temperature, the exhaust throttle valve 22 may fail before the engine body 11 (engine) fails.

Further, if the actual opening degree A of the exhaust throttle valve 22 disposed in the exhaust passage 15 is smaller than the instructed opening degree I due to hysteresis, the flow rate of exhaust gas flowing through the exhaust passage 15 is smaller than the target value, so that the temperature of the exhaust passage 15 increases beyond a limit temperature. As a result, the exhaust throttle valve 22 may fail due to the heat of exhaust gas flowing through the exhaust passage 15. With the above configuration, even when the throttle valve 2 is the exhaust throttle valve 22 disposed in the exhaust passage 15, it is possible to prevent the temperature of the exhaust passage 15 from exceeding the limit temperature by eliminating hysteresis by the hysteresis elimination RA. Thus, it is possible to prevent the exhaust throttle valve 22 from failing.

In some embodiments, as shown in FIG. 1, the engine 1 further includes a turbocharger 17 disposed between a first exhaust pipe 151 and a first intake pipe 142. In the illustrated embodiment, as shown in FIG. 1, the turbocharger 17 includes an exhaust turbine 171 disposed upstream of the exhaust throttle valve 22 and the DOC 41 in the first exhaust pipe 151, and a compressor 172 disposed in the first intake pipe 142.

The exhaust turbine 171 is rotationally driven by exhaust gas discharged from the engine body 11. When the exhaust turbine 171 is rotationally driven, the compressor 172 is rotationally driven, and the air (combustion air) in the compressor 172 is compressed. The air (combustion air) compressed by the compressor 172 passes through the intake throttle valve 21 and then flows into the combustion chamber 12. At this time, by closing the intake throttle valve 21, the flow rate of the air (combustion gas) flowing into the combustion chamber 12 is limited. As shown in FIG. 1, the exhaust gas used for driving the exhaust turbine 171 flows into the exhaust gas purification device 4 after passing through the exhaust throttle valve 22. At this time, by closing the exhaust throttle valve 22, the flow rate of exhaust gas flowing into the exhaust gas purification device 4 is limited. In another embodiment, the exhaust throttle valve 22 may be disposed upstream of the exhaust turbine 171 in the first exhaust pipe 151.

In some embodiments, as shown in FIG. 1, the engine 1 further includes an EGR device 18 configured to return a part of exhaust gas discharged from the combustion chamber 12 to the upstream side of the combustion chamber 12 as EGR gas. The EGR device 18 includes an EGR pipe 181 connected to the intake passage 14 and the exhaust passage 15, and an EGR valve 182 disposed in the EGR pipe 181. In the illustrate embodiment, the EGR pipe 181 is connected at one end to the exhaust passage 15 on the upstream side of the exhaust throttle valve 22 and the turbocharger 17 so as to branch off from the exhaust passage 15. Further, the EGR pipe 181 is connected at the other end to the intake manifold 141 disposed downstream of the intake throttle valve 21 in the intake passage 14. The opening degree of the EGR valve 182 is controlled by the throttle valve opening degree instruction unit 34 of the control device 3 so that the flow rate of EGR gas flowing in the EGR pipe 181 is controlled.

The exhaust gas purification system 10 according to some embodiments includes the control device 3, the DOC 41, the DPF 42, and the throttle valve 2, as shown in FIG. 1. In this case, in the exhaust gas purification system 10, the control device 3 causes the throttle valve 2 to execute the hysteresis elimination RA, so that hysteresis can be eliminated. As hysteresis is eliminated, the difference between the instructed opening degree I and the actual opening degree A of the throttle valve 2 is reduced, so that it is possible to prevent the flow rate of exhaust gas flowing through the exhaust passage 15 from becoming excessive or too small compared with the target value.

As described above, the control method 100 (100A, 100B) according to some embodiments includes the hysteresis occurring condition determination step S102 and the hysteresis elimination execution step S104 as shown in FIGS. 6 and 7. In this case, in the hysteresis occurring condition determination step S102, it is determined whether the hysteresis occurring condition is met. As described above, when the hysteresis occurring condition is met, hysteresis is highly likely to occur. In the hysteresis elimination execution step S104, if it is determined that the hysteresis occurring condition is met, the throttle valve 2 is caused to execute the hysteresis elimination RA. The hysteresis elimination RA involves temporarily increasing the opening degree of the throttle valve 2 from the instructed opening degree I and then returning it to the instructed opening degree I to calibrate the actual opening degree of the throttle valve 2 to the instructed opening degree I when closing. Thus, even if hysteresis occurs, the hysteresis can be eliminated.

With the above method, since hysteresis is eliminated by the hysteresis elimination RA, the opening difference between the instructed opening degree I and the actual opening degree A of the throttle valve 2 is reduced, so that it is possible to prevent the flow rate of exhaust gas flowing through the exhaust passage 15 from becoming excessive or too small compared with the target value. Accordingly, with the above method, it is possible to prevent the operating range where the forced regeneration function of the DPF 42 can be exerted from being narrowed by eliminating hysteresis of the throttle valve 2.

The present invention is not limited to the embodiments described above, but includes modifications to the embodiments described above, and embodiments composed of combinations of those embodiments.

REFERENCE SIGNS LIST

1 Engine
10 Exhaust gas purification system
11 Engine body
12 Combustion chamber
13 Fuel injection valve
14 Intake passage
15 Exhaust passage
16 Exhaust passage injection valve
17 Turbocharger
18 EGR device
2 Throttle valve
21 Intake throttle valve
22 Exhaust throttle valve
3 Control device
30 Time counter 31 Input/output unit
32 Storage unit
33 Injection control unit
34 Throttle valve opening degree instruction unit
35 Forced regeneration execution requirement determination unit
36 DPF forced regeneration execution unit
37 Hysteresis occurring condition determination unit
38 Hysteresis elimination execution unit
39 Instructed opening degree change amount determination unit
4 Exhaust gas purification device
41 DOC
42 DPF
100, 100A, 100B Control method
A Actual opening degree
C, C1 Closing-directional actual opening
H Second instructed opening degree
I, I1 to I8, IE, IS Instructed opening degree
O, O1 Opening-directional actual opening
P Measurement start point
RA Hysteresis elimination
S Predetermined value
T Elapsed time
T1 First predetermined time
T2 Second predetermined time
ΔH Opening degree increase amount
ΔS Instructed opening degree change amount

The invention claimed is:

1. A control device configured to direct an opening degree of a throttle valve disposed in an intake passage or an exhaust passage of an engine including a diesel oxidation catalyst (DOC) disposed in the exhaust passage and a diesel particulate filter (DPF) disposed downstream of the DOC in the exhaust passage, the control device comprising:
an electronic control unit (ECU) including:
a hysteresis occurring condition determination unit configured to determine whether a hysteresis occurring condition is met when the PDF is under forced regeneration, the hysteresis occurring condition being defined as a condition satisfying at least one of a first condition that a predetermined time elapses after an instructed opening degree of the throttle valve becomes equal to or smaller than a predetermined opening degree, or a second condition that a predetermined time elapses after an engine output of the engine becomes equal to or smaller than a predetermined output; and
a hysteresis elimination execution unit configured to cause, if it is determined that the hysteresis occurring condition is met, the throttle valve to execute hysteresis elimination that involves for a moment increasing the opening degree of the throttle valve from the instructed opening degree and then returning the opening degree to the instructed opening degree during the forced regeneration of the DPF.

2. The control device according to claim 1, further comprising a time counter for measuring an elapsed time,
wherein the hysteresis elimination execution unit is configured to cause the throttle valve to execute the hysteresis elimination when the hysteresis occurring condition is met, and the elapsed time counted by the time counter exceeds a first predetermined time.

3. The control device according to claim 2,
wherein the time counter is configured to start measurement of the elapsed time when the instructed opening degree starts increasing or the instructed opening degree stops decreasing while the hysteresis occurring condition is met.

4. The control device according to claim 3,
wherein the first predetermined time is set based on at least one of the instructed opening degree during the measurement of the elapsed time by the time counter or the engine output.

5. The control device according to claim 3,
wherein the time counter is configured to cancel the measurement of the elapsed time when the hysteresis occurring condition is no longer met during the measurement of the elapsed time.

6. The control device according to claim 3,
wherein the time counter is configured to cancel the measurement of the elapsed time when the instructed opening degree of the throttle valve becomes smaller than the instructed opening degree at start of the measurement by the time counter, or when a change amount of the instructed opening degree in a closing direction with respect to a maximum instructed opening degree of the throttle valve during the measurement of the elapsed time becomes equal to or greater than a predetermined value.

7. The control device according to claim 1,
wherein an opening degree increase amount of the throttle valve during the hysteresis elimination is set based on at least one of the instructed opening degree when the hysteresis elimination is executed or the engine output.

8. The control device according to claim 1,
wherein, during the hysteresis elimination, a ramp is provided between a time when the opening degree of the throttle valve starts increasing from the instructed opening degree and a time when reaching a predetermined opening degree, a ramp is provided between a time when the opening degree of the throttle valve starts decreasing from the predetermined opening degree and
wherein, when a time when returning to the instructed opening degree, and a time during which the opening degree is kept at the predetermined opening degree is defined as a second predetermined time,
the second predetermined time is set based on at least one of the instructed opening degree when the hysteresis elimination is executed or the engine output.

9. The control device according to claim 1,
wherein the throttle valve comprises an exhaust throttle valve disposed in the exhaust passage.

10. An exhaust gas purification system, comprising:
the control device according to claim 1;
the DOC;
the DPF; and
the throttle valve.

11. A control method for controlling an opening degree of a throttle valve disposed in an intake passage or an exhaust passage of an engine including a diesel oxidation catalyst (DOC) disposed in the exhaust passage and a diesel particulate filter (DPF) disposed downstream of the DOC in the exhaust passage, the control method comprising:
a hysteresis occurring condition determination step of determining whether a hysteresis occurring condition is met when the DPF is under forced regeneration, the hysteresis occurring condition being defined as a condition satisfying at least one of a first condition that a predetermined time elapses after an instructed opening degree of the throttle valve becomes equal to or smaller than a predetermined opening degree, or a second condition that a predetermined time elapses after an engine output of the engine becomes equal to or smaller than a predetermined output; and a hysteresis elimination execution step of causing, when it is determined that the hysteresis occurring condition is met, the throttle valve to execute hysteresis elimination that involves for a moment increasing the opening degree of the throttle valve from the instructed opening degree and then returning the opening degree to the instructed opening degree during the forced regeneration of the DPF.

\* \* \* \* \*